(12) United States Patent
Satoh et al.

(10) Patent No.: US 9,447,228 B2
(45) Date of Patent: Sep. 20, 2016

(54) POLYMER PRODUCTION APPARATUS AND POLYMER PRODUCTION METHOD

(71) Applicants: Yuuichi Satoh, Kanagawa (JP); Satoshi Izumi, Shizuoka (JP); Taichi Nemoto, Shizuoka (JP); Yoko Arai, Shizuoka (JP); Yasuo Kamada, Shizuoka (JP); Chiaki Tanaka, Shizuoka (JP)

(72) Inventors: Yuuichi Satoh, Kanagawa (JP); Satoshi Izumi, Shizuoka (JP); Taichi Nemoto, Shizuoka (JP); Yoko Arai, Shizuoka (JP); Yasuo Kamada, Shizuoka (JP); Chiaki Tanaka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/542,804

(22) Filed: Nov. 17, 2014

(65) Prior Publication Data

US 2015/0141611 A1    May 21, 2015

(30) Foreign Application Priority Data

Nov. 20, 2013   (JP) .................. 2013-240425
Aug. 26, 2014   (JP) .................. 2014-171174

(51) Int. Cl.
| | |
|---|---|
| C08G 63/08 | (2006.01) |
| C08G 64/30 | (2006.01) |
| B01J 19/24 | (2006.01) |
| C08G 63/78 | (2006.01) |
| C08G 63/81 | (2006.01) |
| C08G 63/02 | (2006.01) |

(52) U.S. Cl.
CPC .............. *C08G 63/08* (2013.01); *B01J 19/24* (2013.01); *C08G 63/785* (2013.01); *C08G 63/81* (2013.01); *C08G 64/30* (2013.01); *B01J 2219/24* (2013.01)

(58) Field of Classification Search
CPC ....... B01J 19/18; C08G 63/08; C08G 63/785
USPC ................................. 422/135, 137
See application file for complete search history.

(56) References Cited

U.S. PATENT DOCUMENTS

| | | | |
|---|---|---|---|
| 2,745,824 A * | 5/1956 | Melchore ............. | B01J 19/1862 526/342 |
| 2015/0353677 A1* | 12/2015 | Izumi .................. | C08G 63/08 422/135 |

FOREIGN PATENT DOCUMENTS

| | | |
|---|---|---|
| JP | 2007-100011 | 4/2007 |
| JP | 2008-256992 | 10/2008 |
| JP | 2013-216851 | 10/2013 |
| WO | WO 2013/018873 A1 | 2/2013 |

* cited by examiner

*Primary Examiner* — Fred M Teskin
(74) *Attorney, Agent, or Firm* — Oblon, McClelland, Maier & Neustadt, L.L.P.

(57) ABSTRACT

A polymer production apparatus, including: supplying unit containing first supplying unit to supply raw materials containing monomer, and second supplying unit to supply compressive fluid; contacting unit to bring the monomer and the compressive fluid into contact together; and outlet configured to discharge reaction product of the monomer, wherein reaction unit is provided between the contacting unit and the outlet, where the reaction unit is to pass the monomer from the contacting unit side to the outlet side, while allowing the monomer to carry out a polymerization reaction in the presence of the compressive fluid, and wherein the reaction unit contains circulation unit containing first pipe and second pipe, where a fluid is passed through the first pipe from the contacting unit side to the outlet side, and the second pipe is to return the fluid from return port provided upstream extrusion unit to inlet provided upstream the return port.

8 Claims, 8 Drawing Sheets

POLYMER PRODUCTION APPARATUS AND POLYMER PRODUCTION METHOD

BACKGROUND OF THE INVENTION

1. Field of the Invention

The present invention relates to a polymer production apparatus and a polymer production method.

2. Description of the Related Art

Conventionally, various types of polymers are produced depending on use thereof, and are used industrially. For example, a biodegradable polymer is known as a material, which is decomposed into water and carbon dioxide by microorganism, and is incorporated into a carbon cycle in nature. Therefore, there is an increasing demand for a biodegradable polymer, as high interest has been recently raised in protection of the environment. As for a polymerization method of a polymer, such as a biodegradable polymer, known is a method where a monomer in a melted state is polymerizable. When a monomer in a melted state is polymerized, however, there is a problem that a yield of a product is low due to influence of heat.

One of the means for solving the aforementioned problem, proposed is, for example, a polyester production apparatus, which contains a reaction tank, a member for supplying a condensate melt product of hydroxycarboxylic acid to the reaction tank, and a member for supplying a polymerization catalyst to the reaction tank, and which is configured to transform the condensate melt product into a cyclic dimmer through depolymerization caused by being contact with the catalyst in the reaction tank to thereby polymerize the dimmer through ring-opening polymerization (see Japanese Patent Application Laid-Open (JP-A) No. 2007-100011). In accordance with the proposed production apparatus, thermal decomposition is minimized during depolymerization for generating lactide monomer serving as a raw material by providing a thin film evaporator equipped with a device for measuring a holdup of the condensate melt product, and forming the condensate melt product into a thin film by this device and performing depolymerization, and therefore a polymer can be attained with high yield.

When a high molecular weight polymer having the number average molecular weight of 80,000 or greater is produced by the production apparatus disclosed in JP-A No. 2007-100011, however, there is a problem that the internal pressure of the apparatus increases as the viscosity is increased due to high molecular weight of the polymer, and the operation of the apparatus becomes unstable.

SUMMARY OF THE INVENTION

Accordingly, the present invention aims to provide a polymer production apparatus, which can stably and continuously produce a high molecular compound.

The polymer production apparatus of the present invention contains:

a supplying unit containing a first supplying unit configured to supply raw materials containing at least a monomer, and a second supplying unit configured to supply a compressive fluid;

a contacting unit configured to bring the monomer supplied from the first supplying unit and the compressive fluid supplied from the second supplying unit into contact with each other; and an outlet configured to discharge a reaction product of the monomer, wherein a reaction unit is provided between the contacting unit and the outlet, where the reaction unit is configured to pass the monomer from the side of the contacting unit to the side of the outlet, while allowing the monomer to carry out a polymerization reaction in the presence of the compressive fluid supplied from the second supplying unit, and wherein the reaction unit contains at least a circulation unit containing a first pipe and a second pipe, where the first pipe is a pipe through which a fluid containing the monomer and the compressive fluid is passed from the side of the contacting unit to the side of the outlet, and the second pipe is configured to return the fluid from a return port provided at an upstream side of an extrusion unit to an inlet provided at an upstream side of the return port.

The present invention can provide a polymer production apparatus, which can stably and continuously produce a high molecular compound, even in the case where the high molecular compound is, for example, a compound having the number average molecular weight of greater than 80,000.

DETAILED DESCRIPTION OF THE INVENTION

Figure 1:
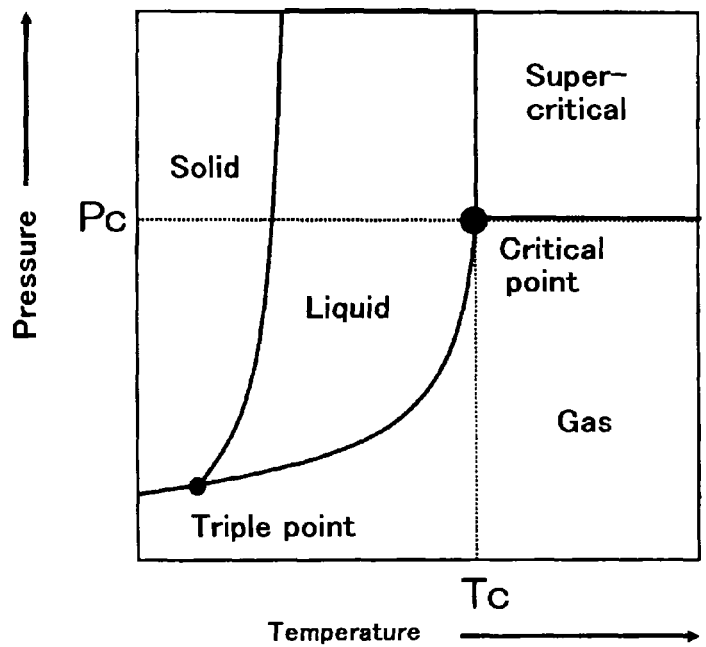
FIG. 1 is a typical phase diagram illustrating a state of a substance with respect to temperature and pressure.

An embodiment of the present invention is explained hereinafter. Note that, the embodiment of the present invention is not limited to those described below, as long as it is within the spirits of the present invention.

[Polymer Production Apparatus]

The polymer production apparatus of the present invention contains: a supplying unit containing a first supplying unit configured to supply raw materials containing at least a monomer, and a second supplying unit configured to supply a compressive fluid; a contacting unit configured to bring the monomer supplied from the first supplying unit and the compressive fluid supplied from the second supplying unit into contact with each other; and an outlet configured to discharge a reaction product of the monomer.

Moreover, provided between the contacting unit and the outlet is a reaction unit configured to send the monomer from the side of the contacting unit to the side of the outlet with reacting the monomer through a polymerization reaction in the presence of the compressive fluid supplied from the second supplying unit.

The reaction unit contains at least a circulation unit, and preferably further contains an extrusion member provided adjacent to the side of the outlet relative to the circulation unit. Moreover, the circulation unit contains a first pipe through which a fluid is passed through from the side of the contacting unit to the side of the outlet, and a second pipe configured to return the fluid from a return port, which is provided at the upstream side from the extrusion member, to an inlet, which is provided at the upstream side from the return port.

Moreover, the reaction unit is characterized by that the reaction unit contains a cooling device for cooling the fluid passed through the second pipe.

The first pipe is characterized by that the first pipe is arranged in a manner that the fluid passed through the second pipe has a vertical direction vector component.

The second pipe is characterized by that the second pipe is arranged in a manner that the fluid passed through the second pipe has a vertical direction vector component.

[Polymer Production Method]

The polymer production method of the present invention contains passing raw materials containing a monomer and a compressive fluid from an upstream to a downstream while continuously bringing the raw materials containing the monomer and the compressive fluid into contact with each other to react the monomer through a polymerization reaction, and passing at least part of a fluid containing the raw materials and the compressive fluid flown to the downstream from the downstream to the upstream to thereby circulate the fluid.

As a monomer is polymerized in the presence of a compressive fluid, the polymerization reaction can be carried out at the temperature lower than the conventional reaction temperature. Therefore, tint, or deterioration of a reaction product due to heat can be reduced. As the circulation unit is provided to the reaction unit, blending of the compressive fluid and the reaction product is accelerated with preventing an uneven inclusion of an unreacted product, and thus a uniform polymer with a low unreacted product content can be attained with high yield. In the case where the circulation unit is not provided, on the other hand, the compressive fluid and the monomer, or a polymer obtained by polymerizing the monomer are separated, and therefore the internal pressure of the apparatus may increase due to an increase in the viscosity of the fluid. In the case where the fluid is circulated without the compressive fluid even through the circulation unit is provided, the viscosity of the fluid may be increased due to generation of the retained area, or the reaction may be carried out unevenly, and therefore the yield is typically low. The polymer production method of the present invention exhibits an excellent effect that an increase in a viscosity of a fluid is prevented by circulating the fluid in the presence of the compressive fluid, the reaction is therefore uniformly carried out, and thus a yield of the polymer product is improved.

Embodiment 1

The embodiment of the present invention is specifically explained with reference to drawings hereinafter.

First, one embodiment of the polymer production apparatus of the present invention is explained with reference to FIGS. 3A and 3B.

The polymer production apparatus 100 contains a supplying unit 100a configured to supply raw materials containing a ring-polymerizable monomer as one example of a monomer, and a compressive fluid, and a polymer production apparatus main body 100b configured to polymerize the ring-opening polymerizable monomer supplied by the supplying unit 100a. The supplied products, such as the raw materials, supplied by the supplying unit 100a, are passed through a pipe 30.

To the supplying unit 100a, tanks (1, 3, 5, 7, 11), measuring feeders (2, 4), and measuring pumps (6, 8, 12) were provided. Note that, the number or arrangement of the tanks, measuring feeders, and measuring pumps are appropriately changed depending on the necessity.

To the polymer production apparatus main body 100b, provided between a contacting unit 9 configured to bring the supplied raw materials and compressive fluid into contact with each other, and an outlet 21 configured to discharge a reaction product of the monomer, are a reaction unit 14 containing a circulation unit 14a and an extrusion unit 14b provided at the downstream side of the circulation unit 14a. As illustrated in FIG. 3A, moreover, a feeding pump 10 or an opening and closing unit, such as an extrusion cap 15, may be appropriately provided.

In the present embodiment, a ring-opening polymerizable monomer is stored in the tank 1 of the supplying unit 100a. The stored ring-opening polymerizable monomer may be in the state of a powder, or a liquid.

Figure 2:
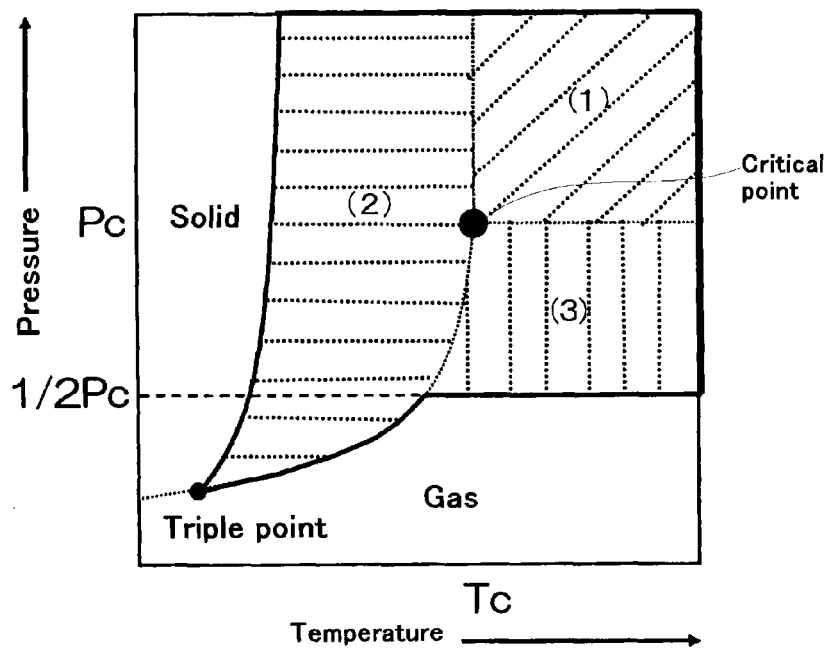
FIG. 2 is a phase diagram for defining a range of a compressive fluid.

The tank 3 stores solids (powder or particles) among the materials used as the initiator, catalyst mixture, and additives. The tank 5 stores liquids among the materials used as the initiator, catalyst mixture, and additives. The supplied materials stored in the tank 3 and the supplied materials stored in the tank 5 may be exchanged. Moreover, the supplied materials stored in the tank 3 and the tank 5 may be both solids, or both liquids. In the case where the initiator and additives are all solids, the polymer production apparatus 100 may not contain the tank 5 and the measuring pump 6. In the case where the initiator and additives are all liquids, similarly, the polymer production apparatus 100 may not contain the tank 3 and the measuring feeder 4. The tank 7 stores a compressive fluid. Note that, the tank 7 may store gas or a solid that is transformed into a compressive fluid upon application of heat or pressure during the process for supplying to the contact unit 9, or within the contact unit 9. In this case, the gas or solid stored in the tank 7 is transformed into the state of (1), (2), or (3) of FIG. 2 in the contact section 9 upon application of heat or pressure. FIG. 2 is a phase diagram for defining the range of a compressive fluid in the present embodiment. The compressive fluid is specifically explained later.

The measuring feeder 2 is one example of a supplying member provided to the first supplying unit configured to supply raw materials containing a monomer, and the measuring feeder 2 measures the ring-opening polymerizable monomer stored in the tank 1, and continuously supply to the contacting unit 9.

The measuring feeder 4 is one example of a supplying member configured to measure the solids stored in the tank 3 and continuously supply to the contacting unit 9.

The measuring pump 6 is one example of a supplying member configured to measure the liquids stored in the tank 5 and continuously supply to the contacting unit 9.

The measuring pump 8 is one example of a supplying member provided to the second supplying unit configured to supply a compressive fluid, and the measuring pump 8 continuously supply the compressive fluid stored in the tank 7 to the contacting unit 9 at the constant pressure and flow rate.

At the downstream from the contacting unit 9, an inlet 13a for further supplying a compressive fluid may be provided. An area where the compressive fluid introduced from the inlet 13a and the fluid from the contacting unit 9 are brought into contact with each other is called a contacting unit 13. Note that, the compressive fluid introduced into the contacting unit 13 is taken out from the tank 7 in FIG. 3A, but the compressive fluid may be supplied from a supplying member other than the tank 7.

Figure 3A:
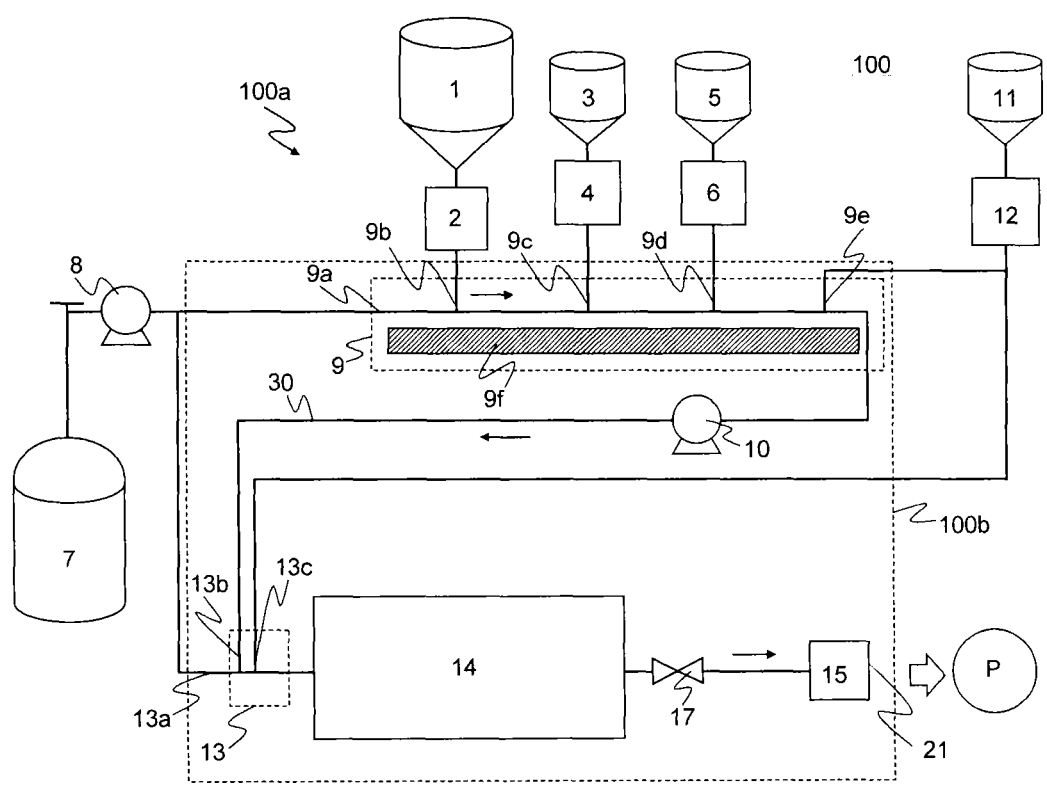
FIG. 3A is a diagram illustrating one example of the polymer production apparatus of the present invention.

In the polymer production apparatus 100 illustrated in FIG. 3A, the compressive fluid supplied from the tank 7 may supply to the contacting unit 9 and the contacting unit 13 at the same time. Alternatively, the compressive fluid may be selectively supplied either the contacting unit 9 or the contacting unit 13. Although they are not illustrated, valves capable of measuring and adjust a flow rate are respectively provided to the contacting unit 9 and the contacting unit 13 in view of the management of the flow rate.

Note that, in the present specification, the phrase "continuously supply" is used as a concept in reverse to a supply per batch, and means to supply in a manner that a generated polymer is continuously obtained from the outlet, without stopping a flow of a fluid supplied to the reaction system and passed through the pipe while performing the polymerization reaction. Specifically, each material may be intermittently supplied.

The contacting unit 9 is composed of a pressure resistant device or pipe, which is configured to continuously bring the raw materials, such as the ring-opening polymerizable monomer, the initiator, and the additives, supplied from the tanks (1, 3, 5, 11) into contact with the compressive fluid supplied from the tank 7. In the contacting unit 9, the raw materials are melted or dissolved by bringing the raw materials into contact with the compressive fluid.

In the present embodiment, "melting" denotes a state where raw materials or a generated polymer is plasticized with swelling, or liquidized by being in contact with a compressive fluid. Moreover, "dissolving" denotes a state where raw materials are dissolved in a compressive fluid. In the case where the ring-opening polymerizable monomer is dissolved, a fluid phase is formed. In the case where the monomer is melted, a melt phase is formed. It is preferred that one phase of either the melt phase or the fluid phase be formed in order to uniformly carry out a reaction. In order to carry out the reaction at a high ratio of the raw materials to the compressive fluid, moreover, the monomer is preferably melted. Note that, in the present embodiment, the raw materials, such as the ring-opening polymerizable monomer, and the compressive fluid can be continuously brought into contact with each other at the constant ratio of concentration in the contacting unit 9, by continuously supplying the raw materials and the compressive fluid. As a result, the raw materials can be efficiently dissolved, or melted.

The contacting unit 9 may be composed of a tank-shaped or tube-shaped device, but the contact unit 9 is preferably a tube-shaped device (contacting vessel) from one end of which the raw materials are supplied, and from the other end of which the mixture, such as a melt phase, or a fluid phase is taken out. Moreover, a stirring device configured to stir the raw materials and the compressive fluid may be provided to the contacting unit 9. As for the stirring device, preferred are a tank equipped with stirring rings, a single screw stirring device, a twin-screw stirring device where screws are engaged with each other, a biaxial mixer containing a plurality of stirring elements which are engaged or overlapped with each other, a kneader containing spiral stirring elements which are engaged with each other, or a static mixer.

Particularly, the twin-screw or multi-screw stirring device where screws are engaged with each other is preferable, as there is less depositions of a reaction product to the stirring device or the vessel, and they have a self-cleaning function. In the case where the contacting unit 9 does not contain a stirring device, the contacting unit 9 is composed of part of the pressure resistant pipe 30. In the case where the contacting unit 9 is composed of the pipe 30 as in the present embodiment, the ring-opening polymerizable monomer to be supplied to the contacting unit 9 is preferably liquidized in advance in order to surely mix all the materials in the contacting unit 9.

The contacting unit 9 is equipped with an inlet 9a, which is one example of a compressive fluid inlet configured to introduce the compressive fluid supplied from the tank 7 by the measuring pump 8, an inlet 9b, which is one example of a monomer inlet configured to introduce the ring-opening polymerizable monomer supplied from the tank 1 by the measuring feeder 2, an inlet 9c configured to introduce the powder supplied from the tank 3 by the measuring feeder 4, an inlet 9d configured to introduce the liquid supplied from the tank 5 by the measuring pump 6, and an inlet 9e configured to introduce the liquid supplied from the tank 11 by the measuring pump 12.

In the present embodiment, each inlet (9a, 9b, 9c, 9d, 9e) is composed of a pipe member, such as part of a cylinder or the pipe 30 for supplying the raw materials in the contacting unit 9, and a connector configured to connect the pipes for transporting each of the raw materials or the compressive fluid. The connector is appropriately selected depending on the intended purpose without any limitation, and examples thereof include a reducer, a coupling, a Y-type connector, a T-type connector, and an outlet. To the contacting unit 9, moreover, a heater 9f for heating the supplied raw materials or compressive fluid is provided.

The feeding pump 10 feeds the mixture formed in the contacting unit 9, such as a melt phase, and a fluid phase, to the downstream side.

The tank 11 stores a catalyst. The catalyst stored in the tank 11 is measured by a supplying member, such as a measuring pump 12, and the catalyst is then supplied to the contacting unit 9 and/or the contacting unit 13. Note that, in the present embodiment, a system where the catalyst is introduced from the tank 11 to the contacting unit 9 via the inlet 9e, and the catalyst is introduced to the contacting unit 13 from the inlet 13c, as illustrated in FIG. 3A, is explained, and the catalyst is supplied to the contacting unit 9 and/or the contacting unit 13. However, the catalyst may be supplied to the other locations, other than the contacting unit 9 and/or the contacting unit 13. For example, the monomer and the catalyst may be mixed in the tank 1 in advance.

The contacting unit 13 may be provided a stirring device configured to stir the raw materials, and the compressive fluid. As for a stirring device, preferred are a tank equipped with stirring wings, a single screw stirring device, a twin-screw stirring device where screws are engaged with each other, a biaxial mixer containing a plurality of stirring elements which are engaged or overlapped with each other, a kneader containing spiral stirring elements which are engaged with each other, or a static mixer. Particularly, the static mixer is preferable, as the structure thereof is simple and does not include a motion unit, and there is less depositions of a reaction product to the internal area of the stirring device. In the case where the contacting unit 13 does not contain a stirring device, the contacting unit 13 is composed of part of the pressure resistant pipe 30. Note that, in the case where the contacting unit 13 is composed of the pipe 30, the ring-opening polymerizable monomer to be supplied to the contacting unit 13 is preferably liquidized in advance in order to surely mixing all the materials in the contacting unit 13. Moreover, the contacting unit 13 is preferably equipped with a heater 13d for heating the fed raw materials.

Next, the reaction unit 14 is explained with reference to FIG. 3B. FIG. 3B is a diagram illustrating a specific structure of the reaction unit 14 of FIG. 3A.

The reaction unit 14 contains a circulation unit 14a, and an extrusion unit 14b provided at the downstream side (the side of the outlet 21 of the reaction product) from the circulation unit 14a. The circulation unit 14a contains a circulation unit, which contains a first pipe 31a where the fluid flown from the contacting unit 9 and/or the contacting unit 13 to the downstream via the pipe 30 is passed through, and a second pipe 31b configured to return the fluid flown from the first pipe to an inlet 20b provided at the upstream side from a return port 20a provided at the upstream side from the extrusion unit 14b.

The circulation unit is preferably appropriately equipped with a stirring device, or a fluid pump. Moreover, the circulation unit is preferably further equipped with a heater for heating the fluid passing through the first pipe 31a, and a cooling device for reducing the reaction heat of the fluid passing through the second pipe 31b to thereby prevent thermal decomposition. As for the cooling device, for example, a cooling device, such as a multitube heat exchanger, and a double pipe heat exchanger, may be used alone, or a composite cooling device, in which a stirring device is equipped with any of the above-listed cooling device, may be used. By using the stirring device and the cooling device in combination, thermal decomposition due to heat of the reaction is inhibited as well as accelerating the reaction with stirring. As for the composite cooling device, for example, preferred is a cooling device, in which a static mixer is provided inside a heat transfer pipe of a multitube heat exchanger.

Figure 3B:
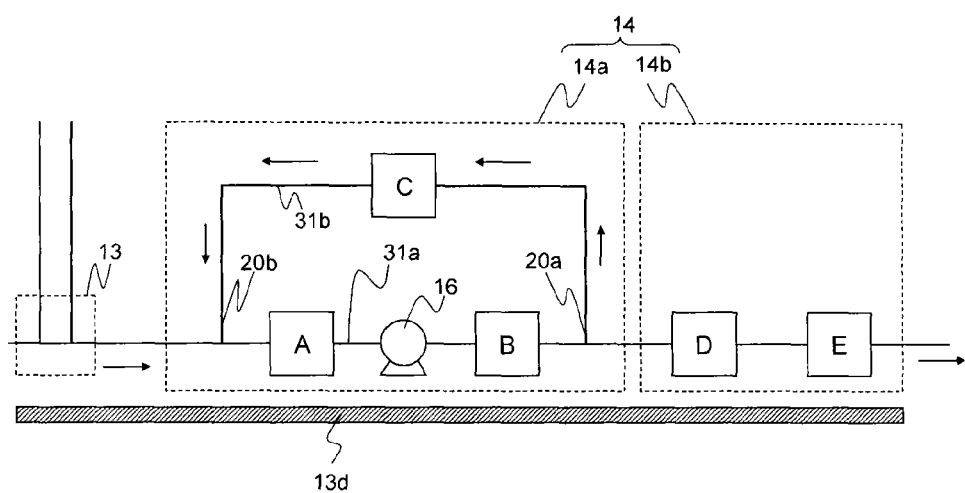
FIG. 3B is a diagram for specifically explaining a reaction unit of the polymer production apparatus of FIG. 3A.

In FIG. 3B, the inlet 20b is provided at the upstream from Device A, but the inlet 20b may be provided at the downstream from Device A. In FIG. 3B, moreover, the return port 20a is provided at the downstream from Device B, but the return port 20a may be provided at the upstream from Device B. Note that, the fluid pump 16 is preferably provided between the return port 20a and the inlet 20b, as this configuration can achieve excellent circulation of a fluid.

The fluid passed through the pipe 30 and flown into the reaction unit 14 has a problem that the compressive fluid component and another component (a component containing the monomer and the reaction product thereof) contained in the fluid is easily separated into two phases, e.g., an upper phase, and a lower phase, due to a difference in the specific gravity thereof. When a polymerization reaction of a monomer is carried out with the fluid being separated into two phases, the viscosity is increased along with an increase in a molecular weight of a reaction product. As a result, a failure, such as clogging, may be caused. The phase separation of the fluid can be presented by providing a circulation unit, as in the present invention. As a result, a plasticizing effect of the compressive fluid is sufficiently exhibited, and the increase in the viscosity of the fluid can be suppressed. Note that, the circulation unit is a system where a flow of the fluid has a vertical direction vector component. In the first pipe and/or second pipe, the pipe part is preferably arranged that the fluid flows in the vertical direction (e.g., $\theta=90°$ in FIG. 7), the upper diagonal direction (e.g., $0°<\theta<90°$ in FIG. 7), or the lower diagonal direction (e.g., $0°<\theta<-90°$ in FIG. 7). Note that, in FIG. 7, $\theta$ is preferably $30°\leq|\theta|\leq90°$, more preferably $45°\leq|\theta|\leq90°$. In the first pipe and/or second pipe, moreover, for example, a zigzag pipe part where the fluid flows in the vertical direction in the zigzag manner, or a spiral pipe part (e.g., an embodiment as illustrated in FIG. 8) may be provided. A diameter of the pipe is not particularly limited, the pipe may have a uniform diameter, or a diameter may be varied within the pipe.

To the extrusion unit 14b, other than a pump extruder, such as a syringe pump, and a gear pump, an extruding member, such as a special extruder (e.g., a monoaxial extruder, a multiaxial extruder, and a screw extruder) is provided. Among these extruding devices, preferred are a gear pump, a monoaxial extruder, and a multiaxial extruder, as they enable stable ejection, and give low shearing force to a polymer after a polymerization reaction. Moreover, other than the extruding member, a stirring member may be provided to the extrusion unit 14b.

Examples of the stirring member provided to the circulation unit 14a and/or the extrusion unit 14b include a dual- or multi-axial stirrer having screws engaging with each other, stirring elements of 2-flights (rectangle), stirring elements of 3-flights (triangle), or circular or multi-leaf shape (clover shape) stirring wings. These are preferable in view of self-cleaning properties thereof. Moreover, a motionless mixer, which divides and compounds (recombines) the flows in a multiple stages by a guiding device, can be used as the stirring member.

Examples of the motionless mixer include a static mixer, and a blending device that does not have a moving part similar to the above-listed. Other than the above, for example, multiflux batch mixers disclosed in Japanese examined patent application publication (JP-B) Nos. 47-15526, 47-15527, 47-15528, and 47-15533; and a Kenics-type mixer disclosed in Japanese Patent Application Laid-Open (JP-A) No. 47-33166 can be used as the motionless mixer. Note that, the descriptions thereof are incorporated herein for reference.

In the reaction unit 14, a plurality of the stirring device, the cooling device, and/or the extruding device may be provided. The applicable embodiments Nos. 1 to 12 of the arrangement of the stirring device, the cooling device, and the extrusion device are presented in Table 1. Note that, in Table 1, Device A to Device E are corresponded to the reference A to E of FIG. 3A each given to the circulation unit 14a, and the extrusion unit 14b. In the reaction unit 14 which does not contain Device C, Device C is replaced with a pipe to form the circulation unit 14a.

Note that, as for the combination of the stirring device, the cooling device, and the extruding device in the reaction unit 14, any appropriately selected combination, other than the combinations presented in Table 1, may be used as long as it is within the spirits of the present invention.

TABLE 1

|  | Device A | Device B | Device C | Device D | Device E |
|---|---|---|---|---|---|
| No. 1 | driven stirring device | cooling device | with circulation | | |
| No. 2 | twin screw stirrer | cooling device | with circulation | | |
| No. 3 | static mixer | cooling device | with circulation | | |
| No. 4 | driven stirring device | static mixer | cooling device | | |
| No. 5 | twin screw stirrer | static mixer | cooling device | | |
| No. 6 | static mixer | static mixer | cooling device | | |
| No. 7 | static mixer | cooling device | wide-diameter tube reaction device | gear pump | driven stirring device |
| No. 8 | static mixer | cooling device | tube reaction device | gear pump | twin screw stirrer |
| No. 9 | static mixer | biaxial kneading reaction device | cooling device | gear pump | static mixer |
| No. 10 | twin screw stirrer | static mixer | cooling device | single screw extruder | |
| No. 11 | static mixer | static mixer | cooling device | twin screw extruder | |
| No. 12 | | | with circulation | | |

*In Table 1, the "driven stirring device" is a blender/tank stirring device.
*In Table 1, the "cooling device" is a double pipe heat exchanger.
*In Table 1, the "tube reaction device" is a reaction device, which does not particularly have a stirring function and extrusion function, and is composed of a pipe, and may be, for example, a spiral pipe, or a linear pipe.

As presented in Table 1, the cooling device may be provided at the upstream from the stirring device in the circulation unit 14a, or the stirring device may be provided at the upstream from the cooling device. Moreover, the cooling devices and the stirring devices may be alternately provided.

In the case where the motionless mixer is used as the stirring device, it is preferred that the stirring device be provided at the downstream from the circulation pump 16 because the pressure loss due to the arrangement of the motionless mixer is compensated by the circulation pump 16. By arranging the stirring device at the upstream from the extruding device, the mixture is stirred before a polymerization reaction is locally carried out, and therefore there is an advantage that uniformity of a polymer can be enhanced.

In FIG. 3B, an example where there is on circulation unit 14a in a polymer production apparatus 100 is illustrated, but the polymer production apparatus 100 may have two or more circulation units 14a. In the case where a plurality of the circulation units 14a are provided, the reaction (polymerization) conditions per circulation unit 14a, i.e., temperature, compressive fluid concentration, catalyst concentration, pressure, average retention time, and stirring speed, may be identical, but it is preferred that optimal conditions for each circulation unit be selected depending on the progress of the polymerization. Note that, it is not a very good idea that excessively large number of the circulation units 14a is connected to give may stages, as it may extend a reaction time, or it may complicate a structure of the apparatus. The number of stages is preferably 1 to 4, more preferably 1 to 3. In the case where the circulation units 14a are connected to give many stages, the compressive fluid or catalyst may be added at the second stage or later.

In the case where polymerization is performed with only one reaction unit 14, typically, the degree of polymerization of a resulting polymer or a residual monomer amount is unstable and easily varied, and therefore it is not suitable for industrial production. It is considered that the instability thereof is caused because raw materials having the melt viscosity of a few poises to several tends poises and the polymerized polymer having the melt viscosity of approximately 1,000 poises are present together. On the other hand, the difference in viscosity inside the circulation unit 14a, and extrusion unit 14b (reaction unit 14, also referred to as a polymerization system) can be reduced by melting (liquidizing) the raw materials and the generated polymer in the present embodiment, and therefore a polymer can be stably produced with a reduced number of stages compared to a conventional polymer production apparatus.

The extrusion cap 15 is one example a discharge unit configured to discharge a polymer obtained through a polymerization reaction in the extrusion unit 14b. Note that a polymer product P may be discharged from the extrusion unit 14b by utilizing the pressure difference between inside and outside the extrusion unit 14b. In this case a pressure control valve 17 or measuring pump may be provided at the upstream from the extrusion cap 15 in order to control the discharge amount from the extrusion cap 15.

In the present embodiment, the transporting channel of a monomer or generated polymer from the measuring feeder 2 (first supplying unit) to the extrusion cap 15 (discharge unit) is preferably communicated. As a result of this, a polymerization reaction can be continuously carried out, and therefore formation of a uneven product due to a locally progressed polymerization reaction can be prevented.

Embodiment 2

One embodiment of polymer production using the polymer production apparatus of the present invention is explained hereinafter.
<Raw Materials>
In the present embodiment, the raw materials are materials from which a polymer is produced, and materials that will be constitutional components of a polymer. The raw materials contain at least a monomer, preferably further contain a catalyst, and may further contain other components, such as an initiator, and additives, as required.

As for the monomer, a polymerizable monomer is suitably used.
<<Polymerizable Monomer>>
The polymerizable monomer for use in the present embodiment is preferably a ring-opening polymerizable monomer, although it depends on a combination of a ring-opening polymerizable monomer and compressive fluid for use. Among ring-opening polymerizable monomers, a ring-opening polymerizable monomer containing a carbonyl skeleton, such as an ester bond, in a ring thereof is preferable. In the carbonyl skeleton, oxygen having high electronegativity is bonded to carbon with a n-bond and the n-bond electron is strongly attracted to the oxygen, and thus the oxygen is negatively polarized, and the carbon is positively polarized. Accordingly, the reactivity thereof is high. In the case where the compressive fluid is carbon dioxide, moreover, it is assumed that the affinity between carbon dioxide and a generated polymer is high, as the carbonyl skeleton has the similar structure to that of the carbon dioxide. An effect for plasticizing a generated polymer with the compressive fluid is high due to the aforementioned factors.

Examples of the ring-opening polymerizable monomer include cyclic ester, and cyclic carbonate.

The cyclic ester is appropriately selected depending on the intended purpose without any limitation, but it is preferably a cyclic dimer obtained through dehydration-condensation of an L-form and/or D form of a compound represented by the following general formula (1).

R—C*—H(—OH)(—COOH)    General Formula (1)

In the general formula (1), R is a C1-C10 alkyl group, and C* represents an asymmetric carbon.

Specific examples of the compound represented by the general formula (1) include enantiomers of lactic acid, enantiomers of 2-hydroxybutanoic acid, enantiomers of 2-hydroxypentanoic acid, enantiomers of 2-hydroxyhexanoic acid, enantiomers of 2-hydroxyheptanoic acid, enantiomers of 2-hydroxyoctanoic acid, enantiomers of 2-hydroxynonanoic acid, enantiomers of 2-hydroxydecanoic acid, enantiomers of 2-hydroxyundecanoic acid, and enantiomers of 2-hydroxydodecanoic acid. These may be used alone, or in combination. Among them, enantiomers of lactic acid are preferable since they are highly reactive and readily available.

The cyclic ester for use, which is other than the compound represented by the general formula (1), is appropriately selected depending on the intended purpose without any limitation. Examples thereof include β-propiolactone, β-butyrolactone, γ-butyrolactone, γ-hexanolactone, γ-octanolactone, δ-valerolactone, δ-hexanolactone, δ-octanolactone, ε-caprolactone, δ-dodecanolactone, α-methyl-γ-butyrolactone, β-methyl-δ-valerolactone, glycolide and lactide. Among them, ε-caprolactone is particularly preferable since it is highly reactive and readily available.

The cyclic carbonate is appropriately selected depending on the intended purpose without any limitation, and examples thereof include ethylene carbonate, and propylene carbonate.

<<Catalyst>>

In the present embodiment, a catalyst is preferably used. The catalyst used in the present embodiment is appropriately selected depending on the intended purpose, and may be a metal catalyst containing a metal atom, or an organic catalyst free from a metal catalyst.

The metal catalyst is appropriately selected depending on the intended purpose without any limitation, and examples thereof include: a tin compound, such as tin octylate, tin dibutylate, and bis(2-ethylhexanoic acid)tin salt; an aluminum compound, such as aluminum acetylacetonate, and aluminum acetate; a titanium compound, such as tetraisopropyl titanate, and tetrabutyl titanate; a zirconium compound, such as zirconium isopropoxide; and an antimony compound, such as antimony trioxide.

In the case where use of a polymer to be attained requires safety and stability, an organic compound (organic catalyst) free from a metal atom is preferably used as the catalyst for use in the present embodiment. Use of an organic catalyst free from a metal atom as the catalyst in the present embodiment is preferable, because a duration of a polymerization reaction can be shortened compared to a case where a ring-opening polymerizable monomer is ring-opening polymerized using an organic catalyst free from a metal atom according to a conventional production method, and a polymer production method giving an excellent polymerization rate can be provided. In the present embodiment, the organic catalyst is not particularly limited, as long as it contributes a ring-opening polymerization reaction of a ring-opening polymerizable monomer, and can be released and regenerated through a reaction with alcohol after forming an active intermediate product with the ring-opening polymerizable monomer.

The organic catalyst is preferably a compound having basicity and serving as a nucleophilic agent, more preferably a basic compound containing a nucleophilic nitrogen atom, and more preferably a basic cyclic compound containing a nucleophilic nitrogen atom. Note that, a nucleophilic agent (or nucleophilic) is a chemical species (or characteristics thereof) reactable with an electrophile.

The aforementioned compound is appropriately selected depending on the intended purpose without any limitation, and examples thereof include cyclic monoamine, cyclic diamine (e.g., a cyclic diamine compound having an amidine skeleton), a cyclic triamine compound having a guanidine skeleton, a heterocyclic aromatic compound containing a nitrogen atom, and N-heterocyclic carbine. A cationic organic catalyst is used for the ring-opening polymerization reaction, but the cationic organic catalyst takes hydrogen off (back-biting) from a principle chain of a polymer. Therefore a molecular weight distribution of a resulting polymer product becomes wide and it is difficult to obtain a polymer product having high molecular weight.

Examples of the cyclic monoamine include quinaclidone.

Examples of the cyclic diamine include 1,4-diazabicyclo[2.2.2]octane (DABCO) and 1,5-diazabicyclo(4, 3,0)nonene-5.

Examples of the cyclic diamine compound having a diamine skeleton include 1,8-diazabicyclo[5.4.0]undec-7-ene (DBU) and diazabicyclononene.

Examples of the cyclic triamine compound having a guanidine skeleton include 1,5,7-triazabicyclo[4.4.0]dec-5-ene (TBD) and diphenylguanidine (DPG).

Examples of the heterocyclic aromatic compound containing a nitrogen atom include N,N-dimethyl-4-aminopyridine (DMAP), 4-pyrrolidinopyridine (PPY), pyrrocolin, imidazole, pyrimidine and purine.

Examples of the N-heterocyclic carbine include 1,3-di-tert-butylimidazol-2-ylidene (ITBU).

Among them, DABCO, DBU, DPG, TBD, DMAP, PPY, and ITBU are preferable, as they have high nucleophilicity without being greatly affected by steric hindrance, or they have such boiling points that they can removed under the reduced pressure.

Among these organic catalysts, for example, DBU is liquid at room temperature, and has a boiling point. In the case where such an organic catalyst is selected for use, the organic catalyst can be removed substantially quantitatively from the obtained polymer by treating the polymer under the reduced pressure. Note that, the type of the organic solvent, or whether or not a removal treatment is performed, is determined depending on an intended use of a generated polymer product.

A type and an amount of the organic catalyst for use cannot be determined unconditionally as they vary depending on a combination of the compressive fluid and ring-opening polymerizable monomer for use, but the amount thereof is preferably 0.01 mol % to 15 mol %, more preferably 0.1 mol % to 1 mol %, and even more preferably 0.3 mol % to 0.5 mol %, relative to 100 mol % of the ring-opening polymerizable monomer. When the amount thereof is smaller than 0.01 mol %, the catalyst is deactivated before completion of the polymerization reaction, and as a result a polymer having a target molecular weight of a polymer cannot be obtained in some cases. When the amount thereof is greater than 15 mol %, it may be difficult to control the polymerization reaction.

<<Other Components>>

Other components, such as an initiator, and various additives, may be optionally used in the polymer production method of the present embodiment.

—Initiator—

In the present embodiment, an initiator is preferably used for controlling a molecular weight of a polymer to be obtained.

As for the initiator, any of conventional initiators can be used without any limitation. In the case where the initiator is an alcohol-based initiator, the initiator may be aliphatic monoalcohol, or dialcohol, or polyhydric alcohol, and may be saturated or unsaturated.

Examples of the initiator include: monoalcohol, such as ethanol, propanol, butanol, pentanol, hexanol, heptanol, nonanol, decanol, lauryl alcohol, myristyl alcohol, cetyl alcohol, and stearyl alcohol; dialcohol, such as ethylene glycol, 1,2-propanediol, 1,3-propanediol, 1,3-butanediol, 1,4-butanediol, hexanediol, nonanediol, tetramethylene glycol, and polyethylene glycol; polyhydric alcohol, such as glycerol, sorbitol, xylitol, ribitol, erythritol, and triethanol amine; methyl lactate; and ethyl lactate.

Moreover, a polymer having an alcohol residue at a terminal thereof, such as polycaprolactonediol and polytetramethylene glycol, may be used as the initiator. Use of such a polymer enables to synthesize diblock copolymers or triblock compolymers.

An amount of the initiator for use can be appropriately adjusted depending on a target molecular weight of a polymer, and the mount thereof is preferably 0.03 mol % to 5 mol %, more preferably 0.03 mol % to 0.1 mol %, relative to 100 mol % of a monomer. In order to prevent unevenly initiating polymerization, a monomer and the initiator are preferably sufficiently mixed before the monomer is brought into contact with a catalyst.

—Additives—

Additives may be optionally added for ring-opening polymerization. Examples of the additives include a surfactant, an antioxidant, a stabilizer, an anticlouding agent, a UV ray-absorber, a pigment, a colorant, inorganic particles, various fillers, a thermal stabilizer, a flame retardant, a crystal nucleating agent, an antistatic agent, a surface wet improving agent, an incineration adjuvant, a lubricant, a natural product, a releasing agent, a plasticizer, and other similar agents.

If necessary, a polymerization terminator (e.g., benzoic acid, hydrochloric acid, phosphoric acid, metaphosphoric acid, acetic acid and lactic acid) may be used after completion of a polymerization reaction.

An amount of the additives varies depending on intended purpose for adding the additive, or a type of the additives, but it is preferably 0 parts by mass to 5 parts by mass, relative to 100 parts by mass of a polymer product.

The surfactant for use is preferably a surfactant, which is melted in the compressive fluid, and has compatibility to both the compressive fluid and the ring-opening polymerizable monomer. Use of such a surfactant can give effects that the polymerization reaction can be uniformly carried out, and the resulting polymer has a narrow molecular weight distribution, and can be easily produced as particles. When the surfactant is used, the surfactant may be added to the compressive fluid, or may be added to the ring-opening polymerizable monomer. In the case where carbon dioxide is used as the compressive fluid, for example, a surfactant having groups having affinity with carbon dioxide and groups having affinity with the monomer within a molecule thereof can be used. Examples of such a surfactant include a fluorosurfactant, and a silicone surfactant.

Examples of the stabilized include epoxidized soybean oil, and carbodiimide.

Examples of the antioxidant include 2,6-di-t-butyl-4-methyl phenol, and butylhydroxyanisol.

Examples of the anticlouding agent include glycerin fatty acid ester, and monostearyl citrate.

Examples of the filler include clay, talc, and silica, which have effects as a UV-ray absorbing agent, a thermal stabilizer, a flame retardant, an internal mold release agent, and a crystal nucleus agent.

Examples of the pigment include titanium oxide, carbon black, and ultramarine blue.

<Compressive Fluid>

A compressive fluid used in the production method of the present embodiment is explained next with reference to FIGS. 1 and 2. FIG. 1 is a phase diagram illustrating a state of a substance with respect to temperature and pressure. FIG. 2 is a diagram for defining a range of a compressive fluid in the present embodiment. In the present embodiment, the term "compressive fluid" means a fluid of a substance, which is in a state that is in any of the regions (1), (2), and (3) of FIG. 2 in the phase diagram of FIG. 1.

In such regions, the substance is known to have extremely high density and show different behaviors from those shown at normal temperature and normal pressure. Note that, a substance is a supercritical fluid when it is in the region (1). The supercritical fluid is a fluid that exists as a noncondensable high-density fluid at temperature and pressure exceeding the corresponding critical points, which are limiting points at which a gas and a liquid can coexist. When a substance is in the region (2), the substance is a liquid. In the present embodiment, however, the substance is a liquefied gas obtained by compressing a substance existing as a gas at normal temperature (25° C.) and ambient pressure (1 atm). When a substance is in the region (3), the substance is in the state of a gas. In the present embodiment, however, the substance is a high-pressure gas whose pressure is ½ or higher than the critical pressure (Pc), i.e. ½ Pc or higher.

Examples of a substance for constituting the compressive fluid include carbon monoxide, carbon dioxide, dinitrogen oxide, nitrogen, methane, ethane, propane, 2,3-dimethylbutane, and ethylene. These may be used alone, or in combination. Among them, carbon dioxide is preferable because the critical pressure and critical temperature of carbon dioxide are respectively about 7.4 MPa, and about 31° C., and thus a supercritical state of carbon dioxide is easily formed. In addition, carbon dioxide is non-flammable, and therefore it is easily handled.

In the case where supercritical carbon dioxide is used as a solvent, it has been conventionally considered that carbon dioxide is not suitable for living anionic polymerization, as it may react with basic and nucleophilic substances. However, the present inventors have found that, overturning the conventional insight, a polymerization reaction progresses quantitatively for a short period, by stably coordinating a basic and nucleophilic organic catalyst with a ring-opening monomer even in supercritical carbon dioxide, to thereby open the ring structure thereof, and as a result, the polymerization reaction progresses livingly. In the present specification, the term "living" means that the reaction progresses quantitatively without a side reaction such as a transfer reaction or termination reaction, so that a molecular weight distribution of an obtained polymer is relatively narrow, and is monodispersible.

<Polymerization Method>

Next, the polymerization method of a ring-opening polymerizable monomer by means of the polymer production apparatus 100 is explained with reference to FIGS. 3A and 3B. In the present embodiment, a ring-opening polymerizable monomer and a compressive fluid are continuously supplied, and brought into contact with each other to polymerizable the ring-opening polymerizable monomer through ring-opening polymerization, to thereby continuously obtain a polymer.

First, each measuring feeder (2, 4), measuring pump 6, measuring pump 8, and measuring pump 12 are operated, and the ring-opening polymerizable monomer, initiator, additives, and compressive fluid in the tanks (1, 3, 5, 7, 11) are continuously supplied. As a result, the raw materials and the compressive fluid are continuously introduced into the pipe of the contacting unit 9 from the inlets inlet (9a, 9b, 9c, 9d, 9e). The order for operating the measuring feeders (2, 4), measuring pump 6, measuring pump 8, and measuring pump 12 is not particularly limited, but it is preferred that the measuring pump 8 be operated first, as the raw materials may be solidified due to reduction in temperature, when the initial raw materials are sent to the contacting unit 9 without being in contact with the compressive fluid. Note that, solid (powder or particles) raw materials may have a low accuracy in measuring compared to liquid raw materials. In this case, the solid raw materials may be stored in the tank 5 in the liquidized state in advance, and then the raw materials may be introduced into the contacting unit 9 by the measuring pump 6. In this case, the raw materials can be fed by the feeding pump 10 as they are liquidized, and therefore the compressive fluid may be supplied from the inlet 13a of the contacting unit 13, or continuously supplied dividedly from the inlet 9a and the inlet 13a.

The feeding speed of each raw material by each of the measuring feeders (2, 4) and the measuring pump 6 is adjusted to be constant based on a the predetermined quantity ratio of the ring-opening polymerizable monomer, the initiator, and additives. A total mass of the raw materials supplied per unit time by the respective measuring feeders (2, 4) and measuring pump 6 (the feeding speed of the raw materials g/min)) is adjusted based on the desired physical properties of a polymer, or a reaction time. Similarly, a mass of the compressive fluid supplied per unit time by the measuring pump 8 (the feeding speed of the compressive fluid (g/min)) is adjusted based on the desired physical properties of a polymer, or a reaction time. A ratio of the feeding speed of the raw materials to the feeding speed of the compressive fluid (feeding speed of the raw materials/ feeding speed of the compressive fluid, which is also referred to as a feeding ratio) is preferably 1 or greater, more preferably 3 or greater, even more preferably 5 or greater, and particularly preferably 10 to 20. Moreover, the upper limit of the feeding ratio is preferably 1,000 or smaller, more preferably 100 or smaller, and particularly preferably 50 or smaller.

By setting the feeding ratio to 1 or greater, a reaction is carried out with high concentration of the raw materials and generated polymer (i.e., solid content), as the raw materials and the compressive fluid are fed to the contacting unit 13. In this case, the solid content of the polymerization system is totally different from the solid content of the polymerization system where a small amount of the ring-opening polymerizable monomer is dissolved in a significant amount of a compressive fluid to perform polymerization in accordance with a conventional production method. In accordance with the production method of the present embodiment, a polymerization reaction is efficiently and stably carried out even with a polymerization system of high solid content. Note that, in the present embodiment, the feeding ratio may be set to less than 1. In this case, there is no problem in a quality of a polymer product as obtained, but cost efficiency may be low. When the feeding ratio is greater than 1,000, an effect of the compressive fluid to melt the ring-opening polymerizable monomer may be insufficient, and therefore a intended reaction may not be carried out uniformly.

The raw materials and the compressive fluid are continuously introduced into the pipe of the contacting unit 9 and therefore they are continuously brought into contact with each other. As a result, the raw materials, such as the ring-opening polymerizable monomer, the initiator, and additives, are each dissolved or melted in the contacting unit 9. In the case where the contacting unit 9 is equipped with a stirring device, the raw materials and the compressive fluid may be stirred. In order to prevent the introduced compressive fluid from turning into a gas, the temperature and pressure inside the pipe of the reaction unit 14 are s controlled to the temperature and pressure equal to or greater than the triplet point of the compressive fluid. This control is performed by adjusting the output of the heater 9f of the contacting unit 9, or the supplied amount of the compressive fluid. In the present embodiment, the temperature at which the ring-opening polymerizable monomer is melted may be temperature equal to or lower than a melting point of the ring-opening polymerizable monomer at atmospheric pressure. This is because the internal pressure of the contacting unit 9 becomes high in the presence of the compressive fluid, and therefore the melting point of the ring-opening polymerizable monomer is lowered than the melting point thereof at atmospheric pressure. Therefore, the ring-opening polymerizable monomer is melted in the contacting unit 9, even when an amount of the compressive fluid is small relative to the ring-opening polymerizable monomer.

In order to melt each of the raw materials efficiently, the timing for applying heat to or stirring the raw materials and the compressive fluid in the contacting unit 9 may be adjusted. In this case, heating or stirring may be performed after bringing the raw materials and the compressive fluid into contact with each other, or heating or stirring may be performed while bringing the raw materials and the compressive fluid into contact with each other. To make melting of the materials even more certain, for example, the ring-opening polymerizable monomer and the compressive fluid may be brought into contact with each other after heating the ring-opening polymerizable monomer at the temperature equal to or higher than the melting point thereof. In this case where the contacting unit 9 is composed of a biaxial mixing device, for example, each of the aforementioned aspects may be realized by appropriately setting an alignment of screws, arrangement of inlets (9a, 9b, 9c, 9d, 9e), and temperature of the heater 9f.

In the present embodiment, the additives are supplied to the contacting unit 9 separately from the ring-opening polymerizable monomer, but the additives may be supplied together with the ring-opening polymerizable monomer. Moreover, the additives may be supplied after the completion of the polymerization reaction. In this case, the additives may be added with kneading with a polymer product after taking the obtained polymer product out from the extrusion unit 14b.

The raw materials dissolved or melted in the contacting unit 9 are sent by the feeding pump 10, and supplied to the contacting unit 13 from the inlet 13b. Meanwhile, the catalyst in the tank 11 is measured by the metering pump 12, and the predetermined amount thereof is supplied to the contacting unit 13 from the inlet 13c. The catalyst can function even at room temperature, and therefore, in the present embodiment, the catalyst is added after melting the raw materials in the compressive fluid. In the conventional art, the timing for adding the catalyst has not been discussed in the ring-opening polymerization of the ring-opening polymerizable monomer using the compressive fluid. In the present embodiment, in the course of the ring-opening polymerization, the catalyst is added to the mixture of the raw materials, such as the ring-opening polymerizable monomer, and the initiator, which are sufficiently dissolved or melted in the compressive fluid, and added in the contacting unit 9 or the contacting unit 13, because of the high activity of the catalyst. The place where the catalyst is added is not limited to one place, and the catalyst may be dividedly added to the contacting unit 9 and the contacting unit 13.

The raw materials sent by the feeding pump 10 and the catalyst supplied by the measuring pump 12 are optionally sufficiently stirred by a stirring device of the contacting unit 13, or heated to the predetermined temperature by the heater 13d when transported. As a result, the ring-opening polymerizable monomer is polymerized through ring-opening polymerization in the presence of the catalyst in the reaction unit 14 (polymerization step).

The lower limit of the temperature (polymerization reaction temperature) for ring-opening polymerization of the ring-opening polymerizable monomer is not particularly limited, but it is preferably 40° C., more preferably 50° C., and even more preferably 60° C. When the polymerization reaction temperature is lower than 40° C., it may be take a long time to melt the ring-opening polymerizable monomer with the compressive fluid depending on a type of the ring-opening polymerizable monomer for use, melting may be insufficient, or an activity of the catalyst may be low. As a result, the reaction speed may be reduced during the polymerization, and therefore it may not be able to carry out the polymerization reaction quantitatively.

The upper limit of the polymerization reaction temperature is not particularly limited, but the upper limit thereof is 100° C., or the temperature higher than the melting point of the ring-opening polymerizable monomer by 30° C., whichever higher. The upper limit of the polymerization temperature is more preferably 80° C., or the temperature higher than the melting point of the ring-opening polymerizable monomer by 20° C., whichever higher. When the polymerization reaction temperature is higher than the temperature higher than the melting point of the ring-opening polymerizable monomer by 30° C., a depolymerization reaction, which is a reverse reaction of ring-opening polymerization, tends to be caused equilibrately, and therefore the polymerization reaction is difficult to proceed quantitatively. In the case where a ring-opening polymerizable monomer having a low melting point, such as a ring-opening polymerizable monomer that is a liquid at room temperature, is used, the polymerization reaction temperature may be set to the temperature higher than the melting point thereof by 30° C., in order to enhance the activity of the catalyst. Even in this case, the polymerization reaction temperature is preferably 100° C. or lower. Note that, the polymerization reaction temperature is controlled by a cooling device equipped with the reaction unit 14 and the heat externally applied to the reaction unit 14. The reaction product is supplied to the cooling device and the stirring device by the circulation pump 16 provided inside the reaction unit 14, and is then circulated. As cooling and stirring are enhance by the flow rate of the circulation, the output of the circulation pump 16 is adjusted to give a flow rate that can give the predetermined cooling and stirring performance.

In a conventional polymer production method using supercritical carbon dioxide, a ring-opening polymerizable monomer is polymerized using a large amount of supercritical carbon dioxide, as the supercritical carbon dioxide has a low ability to dissolve a polymer. In accordance with the polymerization method of the present embodiment, a ring-opening polymerizable monomer is polymerized through ring-opening polymerization at a high concentration, which has not been achieved in the conventional art, by a polymer production method using a compressive fluid. In this case, the internal pressure of the reaction unit 14 becomes high in the presence of the compressive fluid, and therefore the glass transition temperature (Tg) of a generated polymer reduces. As a result, a ring-opening polymerization reaction is uniformly carried out even in the state where a concentration of a polymer product is high, as the viscosity of the generated polymer is low.

In the present embodiment, the polymerization reaction time (the average retention time in the reaction unit 14) is appropriately set depending on a target molecular weight of a polymer product to be produced, but the polymerization reaction time is preferably within 1 hour, more preferably within 45 minutes, and even more preferably within 30 minutes. In accordance with the production method of the present embodiment, the polymerization reaction time can be set within 20 minutes. This polymerization reaction time is short, which has not been realized before in polymerization of a ring-opening polymerizable monomer in a compressive fluid.

The pressure for the polymerization, i.e., the pressure of the compressive fluid, may be the pressure at which the compressive fluid supplied by the tank 7 becomes a liquid gas ((2) in the phase diagram of FIG. 2), or high pressure gas ((3) in the phase diagram of FIG. 2), but it is preferably the pressure at which the compressive fluid becomes a supercritical fluid ((1) in the phase diagram of FIG. 2). By making the compressive fluid into the state of a supercritical fluid, melting of the ring-opening polymerizable monomer is accelerated to uniformly and quantitatively carry out a polymerization reaction. In the case where carbon dioxide is used as the compressive fluid, the pressure thereof is preferably 3.7 MPa or higher, more preferably 5 MPa or higher, and even more preferably 7.4 MPa or higher, which is the critical pressure or higher, in view of efficiency of a reaction and polymerization rate. In the case where carbon dioxide is used as the compressive fluid, moreover, the temperature thereof is preferably 25° C. or higher from the same reasons.

The moisture content in the reaction unit 14 is preferably 4 mol % or less, more preferably 1 mol % or less, and even more preferably 0.5 mol % or less, relative to 100 mol % of the ring-opening polymerizable monomer. When the moisture content is greater than 4 mol %, it may be difficult to control a molecular weight of a resulting product as the moisture itself acts as an initiator. In order to control the moisture content in the polymerization system, an operation for removing moistures contained in the ring-opening polymerizable monomer and other raw materials may be optionally provided as a pretreatment.

The polymer product P obtained after completing the ring-opening polymerization reaction in the circulation unit 14b of the reaction unit 14 is discharged outside the circulation unit 14b by the circulation pump 16. The speed for discharging the polymer product P is preferably constant in order to operate with the constant pressure of the polymerization system filled with the compressive fluid, to thereby obtain a uniform polymer product. To this end, the feeding rate of the feeding pump 10 is controlled to give constant ejection pressure of the circulation pump 16. In order to maintain the back pressure of the feeding pump 10 constant, similarly, the feeding speeds of the feeding system inside the contacting unit 9, and the measuring feeders (2, 4), and the measuring pumps (6, 8) are controlled. The control system may be an ON-OFF control system, i.e., an intermittent feeding system, but it is in most cases preferably a continuous or stepwise control system where the rational speed of the pump or the like is gradually increased or decreased. Any of these controls realizes to stably provide a uniform polymer product.

The catalyst remained in the polymer product obtained in the present embodiment is optionally removed. The removal method is appropriately selected depending on the intended purpose without any limitation, and examples thereof include vacuum distillation in case of a compound having a boiling point, a method where the catalyst is extracted by using a compound capable of dissolving the catalyst as an entrainer to thereby remove the catalyst, and a method for removing the catalyst by adsorbing the catalyst with a column.

A system for removing the catalyst may be a batch system where the catalyst is removed after the polymer product is taken out from the extrusion unit 14b, or a continuous process system where the system inside the extrusion unit 14b is processed continuously as it is. In case of vacuum distillation, the vacuum conditions are set based on a boiling point of the catalyst. For example, the temperature for vacuuming is 100° C. to 120° C., and the catalyst can be removed at temperature lower than the temperature at which the polymer product is depolymerized. In the case where an organic solvent is used in the extraction process, it may be necessary to provide a process for removing the organic solvent after extracting the catalyst. Therefore, the compressive fluid is preferably used as a solvent in the extraction process. As for such an extraction process, a conventional technique, such as extraction of perfume, can be applied.

<<Polymer Product>>

The polymer product of the present embodiment is a polymer product obtained by the aforementioned production method, and is preferably a polymer product having a ring-opening polymerizable monomer residue amount of less than 2 mol %, and the number average molecular weight of 80,000 or greater.

In accordance with the polymer production method of the present embodiment, a polymer reaction can be carried out at low temperature as described above by using the compressive fluid. Therefore, a depolymerization reaction can be significantly suppressed compared to conventional melt polymerization. In the present embodiment, therefore, it can achieve the polymerization rate of 96 mol % or greater, preferably 98 mol % or greater. When the polymerization rate is less than 96 mol %, thermal characteristics of a resulting polymer may be insufficient as a polymer product, and it may be necessary to additionally provide a process for removing a ring-opening polymerizable monomer from the polymer product.

The polymerization rate means a ratio of an amount of the ring-opening polymerizable monomer contributing the generation of a polymer to a total amount of the ring-opening polymerizable monomer as a raw material. The amount of the ring-opening polymerizable monomer contributing the generation of the polymer can be determined by deducting an amount of the unreacted ring-opening polymerizable monomer (a ring-opening polymerizable monomer residue amount) from an amount of the generated polymer.

The number average molecular weight of the polymer product obtained in the present embodiment can be adjusted with an amount of the initiator, and is preferably 80,000 or greater, more preferably 80,000 to 250,000, and more preferably 120,000 to 250,000. When the number average molecular weight thereof is greater than 250,000, it may not be economical as productivity is deteriorated due to an increase in the viscosity. When the number average molecular weight thereof is smaller than 80,000, such the polymer may not be preferable, as strength thereof is insufficient.

The value (Mw/Mn) obtained by dividing the weight average molecular weight Mw of the polymer product obtained in the present embodiment with the number average molecular weight Mn thereof is preferably 1.0 to 2.5, is more preferably 1.0 to 2.0. When this value (Mw/Mn) is greater than 2.5, it is highly possible that a polymerization reaction has been unevenly performed, and therefore it is not preferable as it is difficult to control physical properties of a resulting polymer.

A molecular weight of the polymer can be measured by gel permeation chromatography (GPC).

The polymer obtained in the polymer production method has a low yellow index (YI) value. The YI value of the polymer is appropriately selected depending on the intended purpose without any limitation, but the YI value thereof is preferably 5.0 or less, more preferably 2.0 or less. When the YI value is greater than 5.0, there may be a problem in an appearance of the polymer.

The yellow index (YI) value can be determined, for example, by preparing a 2 mm-thick resin pellet, and measuring the pellet by means of a SM color computer (manufactured by Suga Test Instruments Co., Ltd.) in accordance with JIS-K7103.

The polymer product obtained in the present embodiment is produced by the method that does not use a metal catalyst and an organic solvent, and therefore is substantially free from a metal atom and an organic solvent. In addition, a ring-opening polymerizable residue amount therein is extremely small, i.e., preferably less than 4 mol % (the polymerization rate of 96 mol % or greater), more preferably less than 2 mol % (the polymerization rate of 98 mol % or greater), and even more preferably less than 0.1 mol % (the polymerization rate of 99.9 mol % or greater). Therefore, the polymer product has excellent safety and stability.

Accordingly, the particles formed by the polymer of the present embodiment are widely used as commodities, pharmaceutical products, cosmetic products, and electrophotographic toner. Note that, in the present embodiment, the metal catalyst is a catalyst, which is used for ring-opening polymerization and contains a metal. Moreover, the phrase is "substantially free from a metal atom" means that a metal atom derived from a metal catalyst is not contained. Specifically, it can be said that a polymer product does not contain a metal atom, when the metal atom derived from the metal catalyst in the polymer product is detected by a conventional analysis method, such as ICP-atomic emission spectrometry, atomic absorption spectrophotometry, and colorimetry, and the result is equal to or lower than the detection limit. The metal catalyst is appropriately selected depending on the intended purpose without any limitation, and examples thereof include: tin compound, such as tin octylate, tin dibutylate, and bis(2-ethylhexanoic acid)tin salt; an aluminum compound, such as aluminum acetylacetonate, and aluminum acetate; a titanium compound, such as tetraisopropyl titanate, and tetrabutyl titanate; a zirconium compound, such as zirconium isopropoxide; and an antimony compound, such as antimony trioxide. Examples of the metal atom derived from the metal catalyst include tin, alumina, titanium, zirconium, and antimony.

In the present embodiment, moreover, the term "organic solvent" is an organic compound, which is used for ring-opening polymerization and dissolves a polymer obtained by the ring-opening polymerization reaction. When a polymer obtained by a ring-opening polymerization reaction is polylactic acid (L-form 100%), examples of the organic solvent include a halogen solvent (e.g., chloroform, and methylene chloride) and tetrahydrofuran. The phrase "substantially free from an organic solvent" means an amount of the organic solvent in the polymer product measured by the following measuring method is a detection limit or lower.

<Measuring Method of Residual Organic Solvent>

To 1 part by mass of the polymer product that is a subject of a measurement, 2 parts by mass of 2-propanol is added, and the resulting mixture is dispersed for 30 minutes by applying ultrasonic waves, followed by storing the resultant over 1 day or longer in a refrigerator (5° C.) to thereby extract the organic solvent in the polymer product. A supernatant liquid thus obtained is analyzed by gas chromatography (GC-14A, SHIMADZU CORPORATION) to determine quantities of the organic solvent and monomer residues in the polymer product, to thereby measure a concentration of the organic solvent. The measuring conditions for the analysis are as follows.

Device: GC-14A (SHIMADZU CORPORATION)
Column: CBP20-M 50-0.25
Detector: FID
Injection amount: 1 µL to 5 µL
Carrier gas: He, 2.5 kg/cm$^2$
Flow rate of hydrogen: 0.6 kg/cm$^2$
Flow rate of air: 0.5 kg/cm$^2$
Chart speed: 5 mm/min
Sensitivity: Range 101×Atten 20
Temperature of column: 40° C.
Injection temperature: 150° C.

<<Use of Polymer Product>>

The polymer product obtained by the production method of the present embodiment is produced by the method that does not use a metal catalyst and an organic solvent, has a small residual monomer amount, and thus has excellent safety and stability. Accordingly, the polymer product obtained by the production method of the present embodiment can be used in various types of use, such as an electrophotographic developer, a printing ink, a paint for buildings, cosmetic products, and medical materials. At the time of use, various additives may be added to the polymer product for the purpose of improving moldability, fabrication quality, degradability, tensile strength, heat resistance, storage stability, crystallinity, or weather resistance.

Embodiment 3

Embodiment 3 is explained as an applied example of Embodiment 1. In the production method of Embodiment 1, a reaction is carried out quantitatively with hardly leaving monomer residues. In Embodiment 3, therefore, a complex product is synthesized by using the polymer product produced in the production method of Embodiment 1, and appropriately setting the timing for adding a plurality of ring-opening polymerizable monomers. Note that, in the present embodiment, the complex product means a copolymer having two or more polymer segments obtained by separately polymerizing a monomer in a plurality of systems, or a mixture of two or more polymers obtained by separately polymerizing a monomer in a plurality of systems. As one example of the complex product, a synthesis method of a stereo complex is explained hereinafter.

<First Method>

Figure 4A:
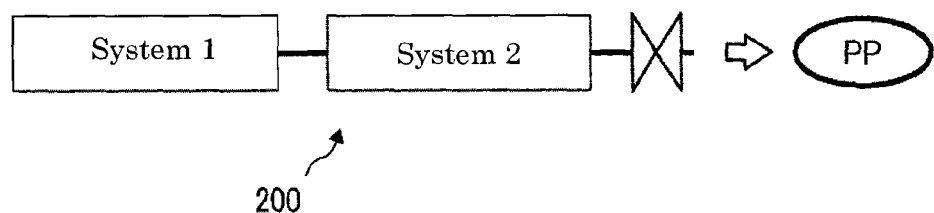
FIG. 4A is a schematic diagram illustrating a complex production system used in the first method.
Figure 4B:
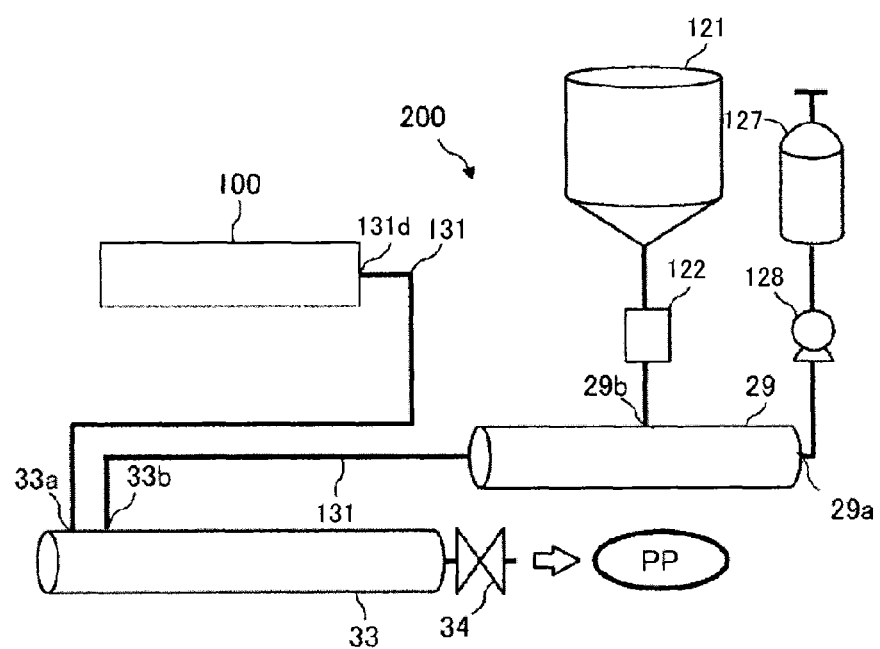
FIG. 4B is a schematic diagram illustrating a specific example of a complex production system used in the first method.

First, the first method is explained with reference to FIGS. 4A and 4B. FIGS. 4A and 4B are schematic diagrams each illustrating a complex production system used in the first method. In the first method, a polymer is generated in the system 1 in the complex production system 200 of FIG. 4A in accordance with the production method of Embodiment 1, and a complex product PP (a final polymer product) is produced by bringing the obtained polymer product P and a second ring-opening polymerizable monomer, which is additionally introduced, into contact with each other in the system 2, to thereby continuously mix the polymer product P and the second ring-opening polymerizable monomer in the presence of the compressive fluid. Note that, a complex product PP having three or more segments can be obtained by repeating the systems the same as the system 2 in series in the complex production system 200 of FIG. 4A.

Subsequently, a specific example of the complex production system 200 is explained with reference to FIG. 4B. The complex production system 200 contains the same polymer production apparatus 100 to that used in Embodiment 1, tanks (121, 127), a measuring feeder 122, a measuring pump 128, a contacting unit 29, a reaction unit 33, and a pressure control valve 34.

In the complex production system 200, the inlet 33a of the reaction unit 33 is connected to the outlet 131d of the polymer production apparatus 100 via a pressure resistant pipe 131. Therefore, the polymer product P generated in the polymer production apparatus 100 can be supplied to the reaction unit 33 in the melted state without returning back to normal pressure.

The tank 121 stores the second ring-opening polymerizable monomer. In the first method, the second ring-opening polymerizable monomer is an optical isomer of the ring-opening polymerizable monomer stored in the tank 121. The tank 127 stores the compressive fluid. The compressive fluid stored in the tank 127 is not particularly limited, but it may be the indentical to the compressive fluid stored in the tank 7 in order to carry out a polymerization reaction uniformly. Note that, the tank 127 may store gas or a solid that is transformed into a compressive fluid upon application of heat or pressure during the process for supplying to the contacting unit 29, or within the contacting unit 29. In this case, the gas or solid stored in the tank 127 is transformed into the state of (1), (2), or (3) of FIG. 2 in the contact section 29 upon application of heat or pressure.

The measuring feeder 122 is configured to measure the second ring-opening polymerizable monomer stored in the tank 121 and continuously supply to the contacting unit 29. The measuring pump 128 is configured to continuously supply the compressive fluid stored in the tank 127 to the contacting unit 29 at the constant pressure and flow rate.

The contacting unit 29 is a device containing a pressure resistant vessel configured to continuously bring the second ring-opening polymerizable monomer supplied from the tank 121 and the compressive fluid supplied from the tank 127 into contact with each other to melt the raw material. The vessel of the contacting unit 29 is equipped with an inlet 29a for introducing the compressive fluid supplied from the tank 127 by the measuring pump 128, and an inlet 29b for introducing the second ring-opening polymerizable monomer supplied from the tank 121 by the measuring feeder 22. As for the contacting unit 29, in the present embodiment, the one identical to the aforementioned contacting unit 9 is used.

The reaction unit 33 is a pressure resistant vessel configured to polymerize the polymer product P, which is obtained through polymerization in the polymer production apparatus, and is obtained as an intermediate product melted with the compressive fluid, with the second ring-opening polymerizable monomer melted with the compressive fluid in the contacting unit 29. The reaction unit 33 is equipped with an inlet 33a for introducing the melted polymer product P as the intermediate into the vessel, and an inlet 33b for introducing the melted second ring-opening polymerizable monomer into the reaction unit 33. The pressure control valve 34 is configured to discharge the complex product PP, which is polymerized in the reaction unit 33, by utilizing a pressure difference between inside and outside the reaction unit 33.

Note that, in the present embodiment, the reaction unit 33 includes the aforementioned contacting unit 13 and reaction unit 14.

In the first method, a ring-opening polymerizable monomer (e.g., L-lactide) is polymerized in the reaction unit 14, and after completing the reaction quantitatively, an optical isomer ring-opening polymerizable monomer (e.g., D-lactide), which is one example of the second ring-opening polymerizable monomer, is added to the reaction unit 33, and a polymerization reaction is further carried out. As a result, a stereo block copolymer is obtained. This method is very effective, because a reaction can be carried out at temperature equal to or lower than the melting point of the ring-opening polymerizable monomer with a small amount of the ring-opening polymerizable monomer residues, so that racemization is rarely caused, and a polymer product can be obtained through a reaction of one stage.

<Second Method>

Figure 5:
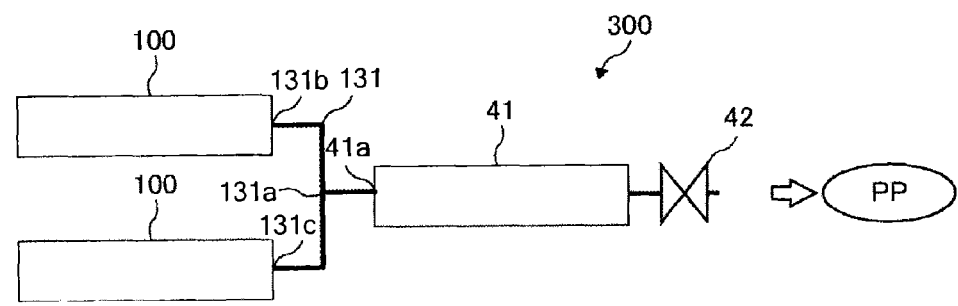
FIG. 5 is a schematic diagram illustrating a complex production system used in the second method.

Subsequently, the second method is explained with reference to FIG. 5. FIG. 5 is a schematic diagram illustrating the complex production system 300 used in the second method. In the second method, a complex product PP is produced by continuously mixing a plurality of polymer products each produced by the production method of Embodiment 1, in the presence of the compressive fluid. Pluralities of the polymer products are polymer products obtained by polymerizing ring-opening polymerizable monomers which are optical isomers to each other. The complex production system 300 contains a plurality of the polymer production apparatuses 100, a blending device 41, and a pressure control valve 42.

In the complex production system 300, an inlet 41a of the blending device 41 is connected to outlets 131b and 131c of the polymer production apparatuses 100 with the pressure resistant pipe 131. Therefore, the polymer product P generated in each polymer production apparatus 100 can be supplied to the blending device 41 in the melted state as it is, without returning back to normal pressure. As a result, the viscosity of each polymer product P can be reduced in the presence of the compressive fluid, and therefore two or more polymer products P can be mixed at the lower temperature in the blending device 41.

FIG. 5 illustrates an example where two polymer production apparatuses 100 are provided parallel by providing one connector 131a to the pipe 131, but three or more polymer production apparatuses 100 may be provided parallel.

The blending device 41 is appropriately selected depending on the intended purpose without any limitation, provided that it is capable of blending a plurality of polymer products supplied from the polymer production apparatuses 100. Examples of the blending device 41 include a device equipped with a stirring device. As for the stirring device, for example, preferred are a single screw stirring device, a twin-screw stirring device where screws are engaged with each other, a biaxial mixer containing a plurality of stirring elements which are engaged or overlapped with each other, a kneader containing spiral stirring elements which are engaged with each other, and a static mixer.

The temperature for mixing the polymer products in the blending device 41 (blending temperature) can be set in the same manner as the polymer reaction temperature in the reaction unit (14, 33). Note that, the blending device 41 may be equipped with a system for separately supplying the compressive fluid to the polymer products to be mixed. The pressure control valve 42 is a device for controlling the flow rate of the complex product PP obtained by mixing the polymer products in the blending device 41.

In the second method, L-form and D-form monomers (e.g., lactide) are polymerized in the compressive fluid in the respective polymerization reaction device 100, in advance. Further, the polymer products obtained through polymerization are blended in the compressive fluid to obtain a stereo block copolymer. A polymer, such as polylactic acid, is typically often decomposed as it is reheated and melted, even in the case where an amount of the ring-opening polymerizable monomer residues is extremely low. The second method is effective, because racemization or thermal deterioration can be prevented similarly to the first method, by blending the low viscous polylactic acid, which has been melted in the compressive fluid, at temperature equal to or lower than the melting point.

Note that, in the first method and the second method, examples where a stereo complex is produced by polymerizing each of the ring-opening polymerizable monomers, which are optical isomers to each other. The ring-opening polymerizable monomers for use in the present embodiment are not necessarily optical isomers to each other. Moreover, it is also possible to mix block copolymers each forming a stereo complex, by combining the first method and the second method.

The polymer production apparatus of Embodiment 3 can perform a polymerization reaction of a monomer with the reaction unit containing the pump circulation, after bringing the raw materials including the monomer and the compressive fluid into contact with each other. As a result, a uniform polymer product with a very small amount of unreacted products is obtained with a high yield by blending the monomer, the polymer generated by the polymerization reaction, and the compressive fluid, even when the polymer product has a high molecular weight.

Embodiment 4

Embodiment 4 is an embodiment where a polymer product is produced by removing a monomer by means of a polymer production apparatus containing a monomer removal unit. As a result, an amount of monomer residues in a polymer product can be extremely small.

Figure 9:
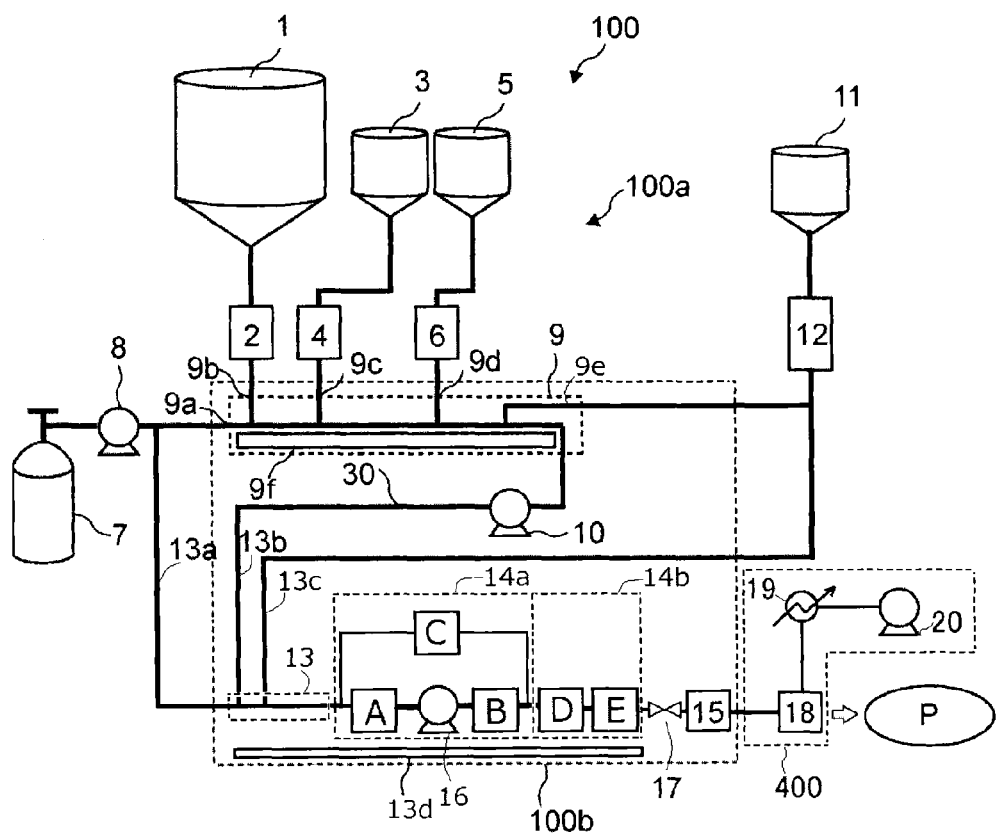
FIG. 9 is a schematic diagram illustrating a polymer production apparatus used in the third method.

Embodiment 4 is preferably performed by means of the polymer production apparatus illustrated in FIG. 9. The polymer production apparatus of FIG. 9 is identical to the polymer production apparatus 100 of Embodiment 1 illustrated in FIGS. 3A and 3B, provided that a monomer separation device 400 as the monomer removal unit is provided to the polymer production apparatus 100.

The monomer separation device 400 is a device for separating a monomer component from a polymer product discharged from an extrusion cap 15, and is used when it is necessary to remove a monomer component from a polymer product because of an intended use thereof.

The polymer product discharged from the extrusion cap 15 rapidly increases the viscosity thereof due to the separation from the compressive fluid, and the reduction in the temperature thereof caused by adiabatic expansion at the time of the separation.

When the polymer product in the high viscous state is transported or stirred in order to separate a monomer, a large shearing energy is applied thereon to cut a molecular chain thereof and decompose the polymer product.

In the monomer separation device 400, a monomer is separated by cutting the resin (polymer product) discharged from the extrusion cap 15 by means of a pelletizer 18 in the vacuum state to form the resin into pellets, with preventing decomposition of the polymer. The separated monomer is collected by a monomer recovery device 19.

In the case where the separation of the monomer is not performed (Embodiment 1), an amount of the residual ring-opening polymerizable monomer in a polymer product is less than 4 mol % (40,000 ppm). In Embodiment 4, an amount of the residual ring-opening polymerizable monomer can be reduced to less than 0.5 mol % (5,000 ppm) by performing the separation of the monomer. The degree of vacuum at the time of removal of the monomer is preferably 10 Torr or lower, more preferably 1 Torr or lower.

The amount of the residual monomer can be determined by a measuring method of a lactide amount described in "Voluntary standard associated with food packaging formed of a synthetic resin, such as polyolefine, the revised $3^{rd}$ edition, supplemented in June, 2004, Part 3, is Hygienic test method, p 13."

EXAMPLES

The present embodiment is more specifically explained through Examples, hereafter. Examples however shall not be construed as to limit the scope of the present invention in any way.

Note that, a molecular weight of the polymer obtained in Examples and Comparative Examples, the polymerization rate of the monomer therein, an amount of the residual monomer in the polymer obtained therein, the feeding ratio therein, the continuous productivity, and the yellow index value of the polymer obtained therein were determined in the following manners.

<Measurement of Molecular Weight of Polymer>

A molecular weight of a polymer was measured by gel permeation chromatography (GPC) under the following conditions.

Apparatus: GPC-8020 (product of TOSOH CORPORATION)
Column: TSK G2000HXL and G4000HXL (product of TOSOH CORPORATION)
Temperature: 40° C.
Solvent: Tetrahydrofuran (THF)
Flow rate: 1.0 mL/min The polymer (1 mL) having a concentration of 0.5% by mass was injected to measure a molecular weight distribution of a polymer under the above conditions. The number average molecular weight Mn and the weight average molecular weight Mw of the polymer were calculated from the molecular weight distribution of the polymer measured under the aforementioned conditions using a molecular weight calibration curve prepared with a monodisperse polystyrene standard sample. The molecular weight distribution is a value obtained by dividing Mw with Mn.

<Continuous Productivity>

After continuously operating the polymer production apparatus as illustrated in FIGS. 3A and 3B, the extruder was dismantled, and whether or not a gelation product had been deposited on a screw, a single s tube, or gear parts were visually evaluated and evaluated based on the following criteria. Note that, in the case where uniformity of a polymer is poor, gel substances were deposited inside the device, and therefore the apparatus cannot be operated continuously.

[Evaluation Criteria]

A: There is no gelation deposition after the continuous operation of 24 hours or longer.

B: There is no gelation deposition after the continuous operation of 12 hours or longer but shorter than 24 hours.

C: There is a gelation deposition after the continuous operation of shorter than 12 hours.

<Polymerization Rate of Monomer>

The polymerization rate of the monomer was determined by the following formula.

Polymerization rate of monomer (mol %)=100−an amount of the unreacted monomer (mol %)

In case of polylactic acid, an amount of the unreacted monomer (mol %) was determined by calculating a ratio of a quartet peak area attributed to lactide (4.98 ppm to 5.05 ppm) to a quartet peak area attributed to polylactic acid (5.10 ppm to 5.20 ppm) by means of a nuclear magnetic resonance apparatus (JNM-AL300, of JEOL Ltd.) in deuterated chloroform, and multiplying the calculated value with 100.

In case of polycaprolactone, an amount of the unreacted monomer (mol %) was determined by calculating a ratio of a triplet peak area attributed to caprolactone (4.22 ppm to 4.25 ppm) to a triplet peal area attributed to polycaprolactone (4.04 ppm to 4.08 ppm) by means of a nuclear magnetic resonance apparatus (JNM-AL300, of JEOL Ltd.) in deuterated chloroform, and multiplying the calculated value with 100.

In case of polycarbonate, an amount of the unreacted monomer (mol %) was determined by calculating a ratio of a singlet peak area attributed to ethylene carbonate (4.54 ppm) to a quartet peak area attributed to polycarbonate (4.22 ppm to 4.25 ppm) by means of a nuclear magnetic resonance apparatus (JNM-AL300, of JEOL Ltd.) in deuterated chloroform, and multiplying the calculated value with 100.

<Feeding Ratio>

The feeding ratio (blending ratio) is a ratio (the feeding speed of the raw materials/the feeding speed of the compressive fluid) of the feeding speed of the raw material to the feeding speed of the compressive fluid. For example, in the polymer production apparatus 100 illustrated in FIG. 3A, the feeding amount of the raw materials from the feeding pump 10 per minute and that of the compressive fluid from the measuring pump 8 per minute were measured using scales, to thereby determine the feeding amount per supplying rate per each rotating speed. The rotating speed of the raw material supplying pump and that of the compressive fluid supplying pump were adjusted with inverters to thereby give the predetermined feeding ratio.

<Amount of Residual Monomer>

An amount of a residual monomer in an obtained aliphatic polyester composition, such as a polylactic acid composition, was measured in accordance with a measuring method of a lactide amount described in "Voluntary standard associated with food packaging formed of a synthetic resin, such as polyolefine, the revised 3rd edition, supplemented in June, 2004, Part 3, Hygienic test method, p 13." Specifically, the aliphatic polyester composition, such as a polylactic acid composition, was homogeneously dissolved in dichloromethane. To the resulting solution, a mixed solution of acetone and cyclohexane was added, to re-deposit the composition. The supernatant liquid as obtained was provided to a gas chromatograph (GC) equipped with a flame ionization detector (FID) to separate monomer residues (e.g., lactide and glycolide). The separated monomer residues were subjected to quantitative determination by an internal reference method, to thereby measure an amount of the monomer residues in the aliphatic polyester composition, such as the polylactic acid composition. Note that, the measurement of the gas chromatography (GC) can be carried out under the following conditions. The term "ppm" depicted in each table denotes a mass fraction.

[Measuring Conditions of GC]

Column: capillary column (Agilent J&W GC Column-DB-17 ms, manufactured by Agilent Technologies, 30 m (length)×0.25 mm (inner diameter), film thickness: 0.25 μm)

Internal Reference: 2,6-dimethyl-γ-pyrone

Column flow rate: 1.8 mL/min

Column temperature: 50° C. for 1 minute, heating at a constant heating speed of 25° C./min to 320° C., retaining temperature at 320° C. for 5 minutes Detector: Flame ionization (FID)

<Yellow Index (YI) Value>

A 2 mm-thick resin pellet was prepared from the obtained polymer product, and a YI value thereof was determined by measuring the pellet by means of an SM color computer (manufactured by Suga Test Instruments Co., Ltd.) in accordance with JIS-K7103. The result was evaluated based on the following criteria.

[Evaluation Criteria]

A: YI value was 2.0 or less
B: YI value was greater than 2.0 but 5.0 or less
C: YI value was greater than 5.0

Example 1

Ring-opening polymerization of L-lactide was carried out by means of the polymer production apparatus 100 illustrated in FIGS. 3A and 3B. The structure of the polymer production apparatus is explained.

Tank 1, Metering Feeder 2:
Plunger pump NP-S462, manufactured by Nihon Seimitsu Kagaku Co., Ltd.

The tank 1 was charged with L-lactide (manufacturer: Purac, melting point: 100° C.).

Tank 3, Metering Feeder 4:
Intelligent HPLC pump (PU-2080), manufactured by JASCO Corporation The tank 3 was charged with lauryl alcohol as an initiator.

Tank 5, Metering Pump 6: Not used in Example 1
Tank 7: Carbonic acid gas cylinder Tank 11, Metering Pump 12:
Intelligent HPLC pump (PU-2080), manufactured by JASCO Corporation The tank 11 was charged with 1,8-diazabicyclo[5.4.0]undec-7-ene (DBU, manufacturer: Tokyo Chemical Industry Co., Ltd.)(organic catalyst).

Introduction Unit 9e: Not used in Example 1.

Reaction Unit 14

Device A: mixer/tank stirring device (driven stirring device)
  Internal diameter of tank: 100 mm
  Tank length: 200 mm
  Tank temperature: 100° C.
  Rotational speed: 30 rpm Device B: cooling device/double pipe heat exchanger
  Internal diameter: 14.3 mm
  Internal diameter of jacket: 43.0 mm
  Heat exchanger length: 150 mm Device A and Device B are connected with pipes (a first pipe 31a and a second pipe 31b) so that a fluid can be circulated, and Device A, Device B, and pipes constitute a circulating unit 14a (Device C in Table 2: with circulation).

Devices C to E: Not used in Example 1.

In Example 1, the driven stirring device (Device A of FIG. 3) and the cooling device (Device B of FIG. 3) were operated under the above-described set conditions (No. 1 of Table 2).

First, the measuring feeder 2 was operated to supply L-lactide in the melted state in the tank 1 to the contacting unit 9 at the constant rate. The measuring feeder 4 was operated to supply lauryl alcohol in the tank 3 to the contacting unit 9 at the constant rate in a manner that the supplied amount of the lauryl alcohol was to be 0.15 mol relative to 99.85 mol of the supplied amount of the L-lactide. The measuring pump 8 was operated to supply carbonic acid gas (carbon dioxide) serving as a compressive fluid from the tank 7 in a manner that the feeding rate was to be 10. The valve of the extrusion cap 15 was adjusted in a manner that the internal pressure of the vessel of the contacting unit 9 was to be 15 MPa. Subsequently, the measuring pump 12 was operated to supply the organic catalyst (DBU) in the tank 11 from the inlet 13c at the constant rate in a manner that the organic catalyst was 0.1 mol relative to 99.9 mol of the L-lactide. As a result, the raw materials such as L-lactide, and lauryl alcohol, the compressive fluid, and DBU each supplied from the respective tank were continuously brought into contact with each other, and blended with a stirring wing, to thereby initiate ring-opening polymerization of the L-lactide.

Subsequently, the polymer (polylactic acid in Example 1) that had started polymerizing at the inlet 13c was sent to the circulation unit 14a by the feeding pump 10. In the circulation unit 14a, the polymer was continued to be polymerized with circulating. The excess heat generated during the reaction was cooled by the cooling device. After circulating the polymer for the predetermined period, the polymer was discharged from the outlet 21 of the extrusion cap 15. In this case, the average retention time of the raw materials from the inlet 13c to the discharge was set to about 60 minutes. The obtained polymer product was subjected to the measurements of physical properties (Mn, Mw/Mn, and polymerization rate) and a residual monomer amount, and evaluation of the continuous productivity and yellow index by the aforementioned methods. The results are presented in Table 3.

Examples 2 to 12 and Comparative Examples 1 to 4

Polymer products of Examples 2 to 12 were obtained in the same manner as in Example 1, provided that a combination of Device A to Device E (a stirring device, a cooling device, an extruder) provided in the reaction unit 14 was changed as depicted as Nos. 2 to 12 of Table 2, respectively.

Polymer products of Comparative Examples 1 to 4 were obtained in the same manner as in Example 1, provided that a combination of Device A to Device E (a stirring device, a cooling device, an extruder) provided in the reaction unit 14 was changed as depicted as Nos. 13 to 16 of Table 2, respectively.

Comparative Example 5

A polymer product of Comparative Example 5 was obtained in the same manner as in Example 1, provided that a combination of Device A to Device E (a stirring device, a cooling device, an extruder) provided in the reaction unit 14 was changed as depicted as No. 17 of Table 2, and the feeding ratio was changed to 1,500.

Example 13

A polymer product of Example 13 was obtained in the same manner as in Example 1, provided that the circulation unit 14a was changed to the spiral circulation unit 14a illustrated in FIG. 8 (Embodiment D of the circulation unit described later).

Next, the embodiments of the reaction unit 14 are summarized in Table 2. Note that, Device A to Device E of Table 2 correspond to Device A to Device E of FIG. 3B, respectively. The reaction unit 14 where Device C was not used was the reaction unit 14 in which the part of Device C was a pipe to form a circulation unit.

Specific structures of Devices A to E are as follows:
Driven stirring device: identical device to Device A of Example 1
Cooling device: identical device to Device B of Example 1
Gear pump: SBJ50, manufactured by Shimadzu Mectem, Inc.
Ejection amount: 50 cc/rev
Rotational speed: adjusted that the pressure at the pump inlet was to be 15 MPa
Twin screw extruder: TEX30, manufactured by The Japan Steel Works, Ltd.
Screws each engaged each other
Cylinder diameter: 30 mm
Identical biaxial rotational directions
Rotational speed: 100 rpm
Single screw extruder: MFC extruder, manufactured by Kawata Mfg Co., Ltd.
Cylinder diameter: 30 mm
Rotational speed: 100 rpm
Twin screw stirrer: screws engaged to each other
Cylinder diameter: 30 mm
Identical biaxial rotational directions
Rotational speed: 30 rpm
Static mixer: N10 Mixer, manufactured by Noritake Co., Limited
Number of elements: 12
Biaxial kneading reaction device: KRC Kneader, manufactured by KURIMOTO, LTD.
Screws engaged to each other
Cylinder diameter: 25 mm
Opposed biaxial rotational directions
Rotational speed: 60 rpm
Tube reaction device:
Internal diameter: 14.3 mm

TABLE 2

|  | Device A | Device B | Device C | Device D | Device E |
|---|---|---|---|---|---|
| No. 1 | driven stirring device | cooling device | with circulation | | |
| No. 2 | twin screw stirrer | cooling device | with circulation | | |
| No. 3 | static mixer | cooling device | with circulation | | |
| No. 4 | driven stirring device | static mixer | cooling device | | |
| No. 5 | twin screw stirrer | static mixer | cooling device | | |
| No. 6 | static mixer | static mixer | cooling device | | |
| No. 7 | static mixer | cooling device | wide-diameter tube reaction device | gear pump | driven stirring device |
| No. 8 | static mixer | cooling device | tube reaction device | gear pump | twin screw stirrer |
| No. 9 | static mixer | biaxial kneading reaction device | cooling device | gear pump | static mixer |
| No. 10 | twin screw stirrer | static mixer | cooling device | single screw extruder | |
| No. 11 | static mixer | static mixer | cooling device | twin screw extruder | |
| No. 12 | | | with circulation | | |
| No. 13 | wide-diameter tube reaction device | cooling device | | | |
| No. 14 | driven stirring device | cooling device | without circulation | | |
| No. 15 | static mixer | | without circulation | | |
| No. 16 | driven stirring device | | without circulation | gear pump | driven stirring device |
| No. 17 | driven stirring device | | without circulation | | |

Wide-diameter tube reaction device:
Internal diameter: 32.9 mm
Next, the embodiment of the circulation unit 14a is described below.

<Embodiment of Circulation Unit>

A: The second pipe 31b was provided to achieve θ=90° in FIG. 7.

B: As in FIG. 6, the second pipe 31b was provided to achieve θ=0° in FIG. 7.

C: The second pipe 31b was provided to achieve θ=45° in FIG. 7.

D: As illustrated in FIG. 8, part of the second pipe 31b was spirally arranged.

Figure 6:
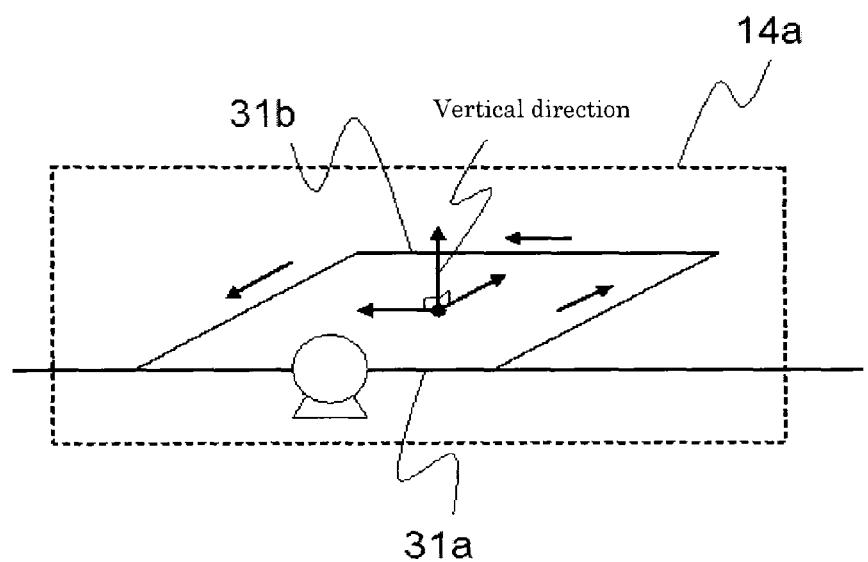
FIG. 6 is a schematic perspective view illustrating one example of a circulation unit, where a second pipe is arranged to be horizontal.
Figure 7:
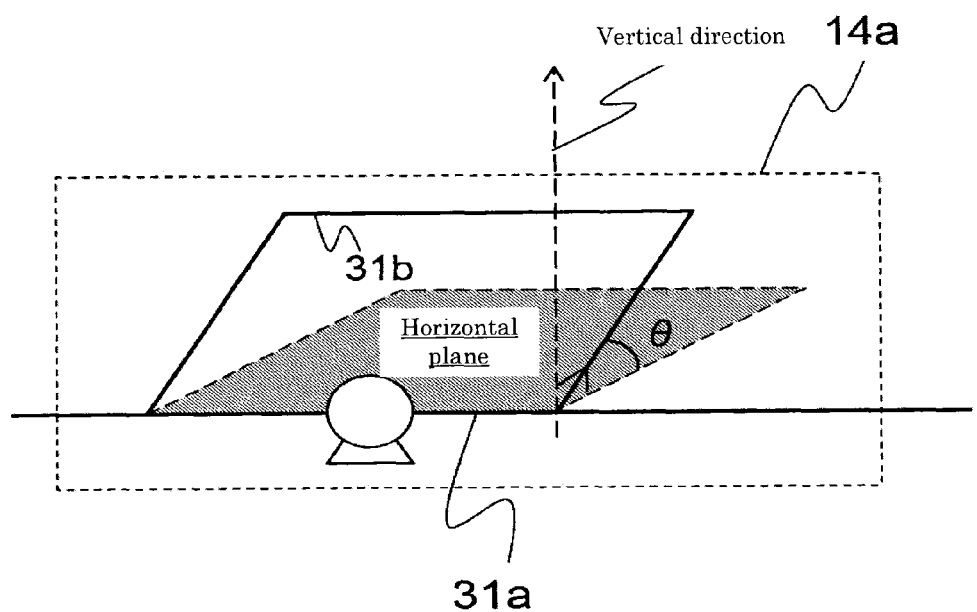
FIG. 7 is a schematic perspective view illustrating one example of a circulation unit where a second pipe is provided.
Figure 8:
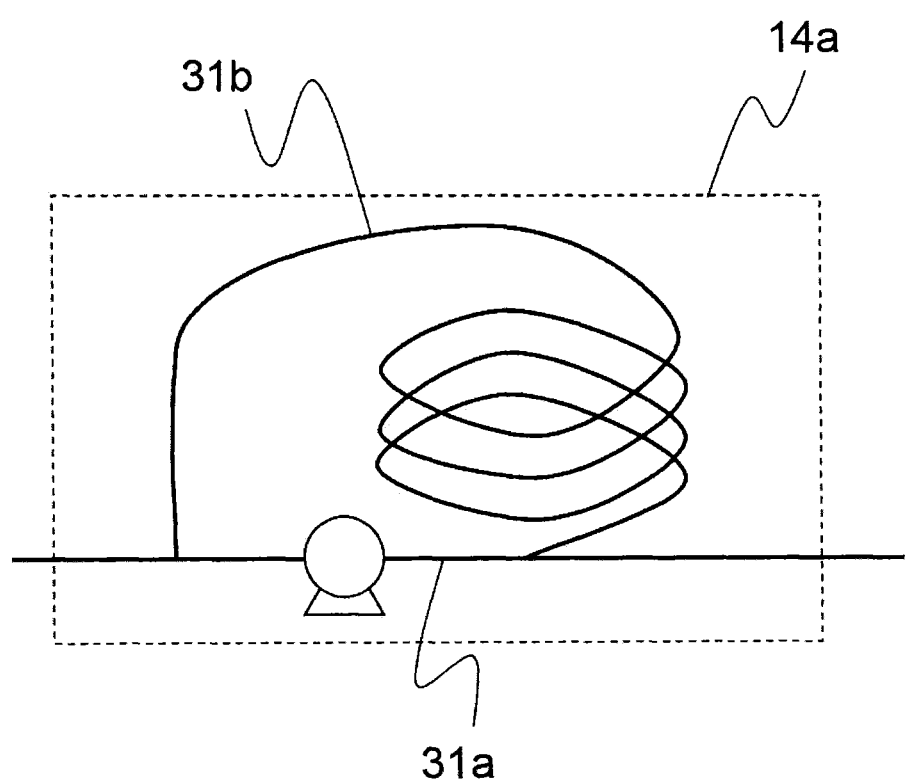
FIG. 8 is a schematic perspective view illustrating one example of a spiral circulation unit where part of the second pipe is spirally arranged.

Note that, in FIGS. 6 to 8, the descriptions of Device A, Device B, and Device C of FIG. 3B are omitted. In reality, however, Device A, Device B, and Device C are provided therein based on Table 2.

Next, each of the polymer products obtained in Examples 2 to 13 was subjected to the measurement of the physical properties thereof (Mn, Mw/Mn, the polymerization rate) and a residual monomer amount, and the evaluations of the continuous productivity and yellow index in the same manner as in Example 1. The results are presented in Tables 3 to 5.

Moreover, each of the polymer products obtained in Comparative Examples 1 to 5 was subjected to the measurement of the physical properties thereof (Mn, Mw/Mn, the polymerization rate) and a residual monomer amount, and the evaluations of the continuous productivity and yellow index in the same manner as in Example 1. The results are presented in Table 12.

Example 14

A polymer product of Example 14 was obtained in the same manner as in Example 1, provided that the catalyst and the monomer were measured and blended in the monomer tank. The obtained polymer product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 6.

Example 15

A polymer product of Example 15 was obtained in the same manner as in Example 1, provided that the reaction temperature was changed as depicted in Table 6. The obtained polymer product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 6.

Example 16

A polymer product of Example 16 was obtained in the same manner as in Example 1, provided that the reaction pressure was changed as depicted in Table 6. The obtained polymer product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 6.

Example 17

A polymer product of Example 17 was obtained in the same manner as in Example 1, provided that the catalyst for use and the reaction temperature were changed as depicted in Table 6. The obtained polymer product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 6.

Example 18

A polymer product of Example 18 was obtained in the same manner as in Example 1, provided that the monomer for use was changed as depicted in Table 6. The obtained polymer product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 6.

Example 19

A polymer product of Example 19 was obtained in the same manner as in Example 1, provided that the monomer for use was changed as depicted in Table 6. The obtained polymer product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 6.

Example 20

A polymer product of Example 20 was obtained in the same manner as in Example 1, provided that the circulation unit 14a was changed to the circulation unit 14a including the horizontal direction vector (Embodiment B of the circulation unit) illustrated in FIG. 6. The obtained polymer product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 7.

Example 21

A polymer product of Example 21 was obtained in the same manner as in Example 1, provided that the circulation unit 14a was changed to the circulation unit 14a (Embodiment C of the circulation unit) including the direction vector of θ=45° illustrated in FIG. 7.

The obtained polymer product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 7.

Example 22

A polymer product of Example 22 was synthesized by removing a residual monomer by means of the polymer production apparatus equipped with the monomer removal device 400 illustrated in FIG. 9.

The structure of the monomer removal device 400 is described below.

Pelletizer 18: aerial hot cut pelletizer

Monomer recovery device 19: plate heat exchanger 2.0 m$^2$

Vacuum pump 20: oil rotary vacuum pump

To cool the monomer recovery device, cooling water of 10° C. was used. The degree of vacuum of the pelletizer was confirmed to be 1.0 Torr or lower by means of a mercury manometer.

A polymer product was obtained in the same manner as in Example 1, provided that the aforementioned monomer removal device 400 connected to the extrusion cap 15 was used. The obtained polymer product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 7.

Example 23

A complex product was produced by means of the complex production system 300 illustrated in FIG. 5. One of the polymer production apparatuses 100 in the complex production system 300 is referred to as the polymer production apparatus 100 of System 1, and the other is referred to as the polymer production apparatus 100 of System 2.

The structure of the complex production system 300 is described below.

Polymer production apparatus 100 (System 1, 2): Identical polymer production apparatus to the one used in Example 1 was used.

Blending device 41: biaxial stirring device equipped with screws engaged to each other Internal diameter of cylinder: 40 mm Identical biaxial rotational directions Rotational speed: 30 rpm L-lactide was polymerized in the polymer production apparatus 100 of System 1 in the same manner as in Example 1, provided that the monomer for use and the monomer feeding rate were changed as depicted in Table 8. Note that, the monomer feeding rate is a supplying speed when the monomer is supplied from the tank 1 to the contacting unit 9. At the same time, D-lactide was polymerized in the polymer production apparatus 100 of System 2 in the same manner as in Example 1, provided that the monomer for use and the monomer feeding rate were changed as depicted in Table 8. Each polymer product (poly L-lactide, poly D-lactide) obtained in each polymer production apparatus 100 was continuously supplied directly to the blending device 41 by the respective measuring pump in the melted state in the presence of the compressive fluid. The polymer products were continuously mixed in the blending device 41 under the conditions depicted in Table 8, to thereby obtain a complex product PP (polylactic acid forming a stereo complex).

The obtained complex product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 8.

Example 24

A complex product of Example 24 was obtained in the same manner as in Example 23, provided that the monomer for use and the monomer feeding speed were changed as depicted in Table 8.

The obtained complex product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 8.

Example 25

A complex product of Example 25 was obtained in the same manner as in Example 23, provided that the catalyst for use and the reaction temperature were changed as depicted in Table 9.

The obtained complex product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 9.

Example 26

Figure 10A:
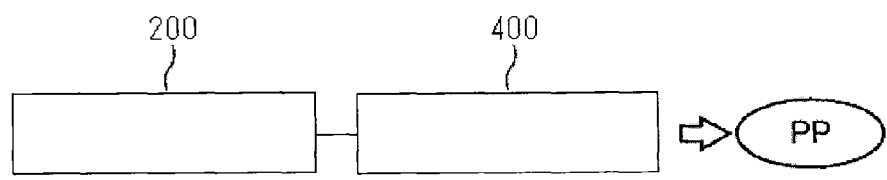
FIG. 10A is a schematic diagram illustrating one example of a complex production system used in the third method.
Figure 10B:
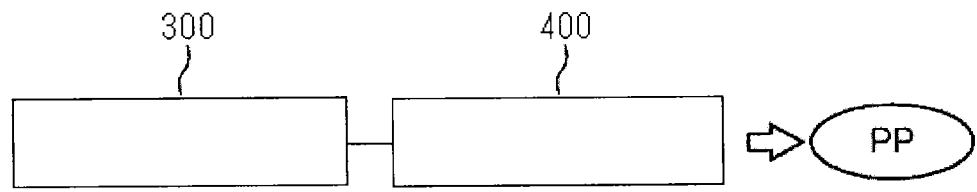
FIG. 10B is a schematic diagram illustrating another example of a complex production system used in the third method.

A complex product of Example 26 was obtained by means of the complex production system illustrated in FIG. 10B in the same manner as in Example 25, provided that the monomer was removed by means of the same monomer removal device 400 as the one used in Example 22.

The obtained complex product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 9.

Example 27

A complex was produced by means of the complex production system 200 illustrated in FIGS. 4A and 4B. The complex production system 200 of FIG. 4A has a structure where the polymer production apparatuses of FIG. 3A are connected in series, and the polymer production apparatus 100 of FIG. 4B is the polymer production apparatus of FIG. 3A. The structure of the complex production system 200 is described below.

Tank 1, Metering feeder 2:

Plunger pump NP-S462, manufactured by Nihon Seimitsu Kagaku Co., Ltd.

The tank 1 was changed with a mixture containing L-lactide, which was served as a ring-opening polymerizable monomer, in the melted state, and lauryl alcohol serving as an initiator in a molar ratio of 99.85:0.15.

Tank 3, Metering feeder 4: Not used in Example 27

Tank 5, Measuring pump 6: Not used in Example 27

Tank 7: Carbonic acid gas cylinder

Tank 127: Carbonic acid gas cylinder

Tank 121, Measuring feeder 122: Plunger pump NP-S462, manufactured by Nihon Seimitsu Kagaku Co., Ltd.

The tank 121 was charged with D-lactide in the melted state as a second ring-opening polymerizable monomer.

Tank 11, Measuring pump 12: Intelligent HPLC pump (PU-2080), manufactured by JASCO Corporation The tank 11 was charged with DBU (organic catalyst).
Contacting unit 9: biaxial stirring device equipped with screws engaged to each other
  Internal diameter of cylinder: 30 mm
  Identical biaxial rotational directions
  Rotational speed: 30 rpm
Contacting unit 29: biaxial stirring device equipped with screws engaged to each other
  Internal diameter of cylinder: 30 mm
  Identical biaxial rotational directions
  Rotational speed: 30 rpm
Inlet 9e: Not used in Example 27
Reaction unit 14: Identical unit to the one used in Example 1 was used.
Reaction unit 33: Identical unit to reaction unit 14 in Example 1 was used.

The measuring feeder 2 was operated to supply the mixture of L-lactide and lauryl alcohol in the tank 1 to the vessel of the contacting unit 9 at the flow rate of 4 g/min (monomer feed rate). The measuring pump 8 was operated to continuously supply the carbonic acid gas in the tank 7 to the contacting unit 9 in a manner that the feeding ratio was to be 10. As a result, the raw materials, such as the L-lactide and lauryl alcohol, and the compressive fluid were continuously brought into contact to each other in the contacting unit 9, and the raw materials were melted.

The raw materials melted in the contacting unit 9 were sent to the circulation unit 14a of the reaction unit 14 by the feeding pump 10. Meanwhile, the measuring pump 12 was operated to supply the polymerization catalyst (DBU) stored in the tank 11 to the reaction unit 14 in a manner that the amount thereof was to be 99.9:0.1 (molar ratio) relative to the supplied amount of the L-lactide. As a result, the L-lactide was polymerized through ring-opening polymerization in the presence of DBU in the reaction unit 14.

Further, the measuring feeder 122 was operated to constantly supply the D-lactide serving as the second ring-opening polymerizable monomer in the tank 121 to the vessel of the contacting unit 29 at the rate of 4 g/min (monomer feeding rate). Moreover, the measuring pump 128 was operated to continuously supply the carbonic acid gas in the tank 127 to the vessel of the contacting unit 29 in a manner that the amount of the carbonic acid gas was to be 5 parts by mass relative to 100 parts by mass of the supplied amount of the D-lactide. As a result, the D-lactide and the compressive fluid were continuously brought into contact with each other in the contacting unit 29, to melt the D-lactide.

The polymer product (L-polylactic acid) in the melted state, which was an intermediate product, and obtained through polymerization in the reaction unit 14, and the D-lactide melted in the contacting unit 29 were introduced into the reaction unit 33. As a result, the polymer product (L-polylactic acid) serving as an intermediate product, and the second ring-opening polymerizable monomer (D-lactide) were polymerized in the reaction unit 33.

Note that, in Example 27, the internal pressure was set to 15 MPa by adjusting the opening and closing of the pressure control valve 34. The temperature of the vessel of the contacting unit (9, 29) was 100° C. at the inlet thereof, and 100° C. at the outlet thereof. The temperature of the reaction unit (14, 33) was 100° C. at both the inlet and the outlet. Moreover, the average retention time of each material in the contacting unit (9, 29), or he reaction unit (14, 33) was set to 60 minutes by adjusting the piping system of the contacting unit (9, 29) or reaction unit (14, 33) and the length thereof.

The pressure control valve 34 was provided to the edge of the reaction unit 33 a complex product PP (polylactic acid forming a stereo complex) was continuously discharged from the pressure control valve 34.

The obtained complex product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 10.

Example 28

A complex product of Example 28 was obtained as a final polymer product in the same manner as in Example 27, provided that the monomer for use was changed as depicted in Table 10. The obtained complex product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 10.

Example 29

A complex product of Example 29 was obtained as a final polymer product in the same manner as Example 27, provided that the catalyst for use and the reaction temperature were changed as depicted in Table 11. The obtained complex product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 11.

Example 30

A complex product of Example 30 was obtained as a final polymer product in the same manner as in Example 29, provided that the complex production system illustrated in FIG. 10A was used, and the monomer was removed by means of the same monomer removal device 400 to the one in Example 22.

The obtained complex product was subjected to the measurement of the physical properties thereof (Mn, Mw/Mn, the polymerization rate) and a residual monomer amount, and the evaluations of the continuous productivity and yellow index in the same manner as in Example 1. The results are presented in Table 11.

TABLE 3

|  | Ex. 1 | Ex. 2 | Ex. 3 | Ex. 4 | Ex. 5 | Ex. 6 |
| --- | --- | --- | --- | --- | --- | --- |
| Monomer | Lactide | Lactide | Lactide | Lactide | Lactide | Lactide |
| Catalyst | DBU | DBU | DBU | DBU | DBU | DBU |
| Initiator | Lauryl alcohol | Lauryl alcohol | Lauryl alcohol | Lauryl alcohol | Lauryl alcohol | Lauryl alcohol |
| Initiator amount (mol %) | 0.15 | 0.15 | 0.15 | 0.15 | 0.15 | 0.15 |
| Feeding ratio | 10 | 10 | 10 | 10 | 10 | 10 |

TABLE 3-continued

|  | Ex. 1 | Ex. 2 | Ex. 3 | Ex. 4 | Ex. 5 | Ex. 6 |
|---|---|---|---|---|---|---|
| Reaction temp. (° C.) | 100 | 100 | 100 | 100 | 100 | 100 |
| Reaction pressure (MPa) | 15 | 15 | 15 | 15 | 15 | 15 |
| Average reaction retention time (min) | 60 | 60 | 60 | 60 | 60 | 60 |
| Embodiment No. of reaction unit (Table 2) | 1 | 2 | 3 | 4 | 5 | 6 |
| Embodiment of circulation unit | A | A | A | A | A | A |
| Mn | 80,000 | 80,000 | 82,000 | 82,000 | 82,000 | 84,000 |
| Mw/Mn | 1.7 | 1.8 | 1.7 | 1.6 | 1.6 | 1.5 |
| Residual monomer amount (ppm) | 21,000 | 20,000 | 13,000 | 9,000 | 10,000 | 4,000 |
| Polymerization rate (%) | 98 | 98 | 99 | 99 | 99 | 100 |
| Continuous productivity | B | B | B | B | B | B |
| Yellow Index | B | B | B | B | B | A |
| Monomer removal | No | No | No | No | No | No |

TABLE 4

|  | Ex. 7 | Ex. 8 | Ex. 9 | Ex. 10 | Ex. 11 | Ex. 12 |
|---|---|---|---|---|---|---|
| Monomer | Lactide | Lactide | Lactide | Lactide | Lactide | Lactide |
| Catalyst | DBU | DBU | DBU | DBU | DBU | DBU |
| Initiator | Lauryl alcohol | Lauryl alcohol | Lauryl alcohol | Lauryl alcohol | Lauryl alcohol | Lauryl alcohol |
| Initiator amount (mol %) | 0.15 | 0.15 | 0.15 | 0.15 | 0.15 | 0.15 |
| Feeding ratio | 10 | 10 | 10 | 10 | 10 | 10 |
| Reaction temp. (° C.) | 100 | 100 | 100 | 100 | 100 | 100 |
| Reaction pressure (MPa) | 15 | 15 | 15 | 15 | 15 | 15 |
| Average reaction retention time (mm) | 60 | 60 | 60 | 60 | 60 | 60 |
| Embodiment No. of reaction unit (Table 2) | 7 | 8 | 9 | 10 | 11 | 12 |
| Embodiment of circulation unit | A | A | A | A | A | A |
| Mn | 84,000 | 81,000 | 82,000 | 85,000 | 88,000 | 82,000 |
| Mw/Mn | 1.5 | 1.5 | 1.5 | 1.4 | 1.4 | 1.5 |
| Polymerization rate (%) | 99 | 100 | 100 | 99 | 100 | 99 |
| Residual monomer amount (ppm) | 14,000 | 4,500 | 4,500 | 9,000 | 4,000 | 13,000 |
| Continuous productivity | B | B | B | B | A | B |
| Yellow Index | B | A | B | A | A | B |
| Monomer removal | No | No | No | No | No | No |

TABLE 5

|  | Ex. 13 |
|---|---|
| Monomer | Lactide |
| Catalyst | DBU |
| Initiator | Lauryl alcohol |
| Initiator amount (mol %) | 0.15 |
| Feeding ratio | 10 |
| Reaction temp. (° C.) | 100 |
| Reaction pressure (MPa) | 15 |
| Average reaction retention time (min) | 60 |
| Embodiment No. of reaction unit (Table 2) | 1 |
| Embodiment of circulation unit | D |
| Mn | 80,000 |
| Mw/Mn | 1.6 |
| Polymerization rate (%) | 100 |
| Residual monomer amount (ppm) | 4,000 |
| Continuous productivity | B |
| Yellow Index | B |
| Monomer removal | No |

TABLE 6

|  | Ex. 14 | Ex. 15 | Ex. 16 | Ex. 17 | Ex. 18 | Ex. 19 |
| --- | --- | --- | --- | --- | --- | --- |
| Monomer | Lactide | Lactide | Lactide | Lactide | ε-caprolactone | Ethylene carbonate |
| Catalyst | DBU | DBU | DBU | Tin | DBU | DBU |
| Initiator | Lauryl alcohol | Lauryl alcohol | Lauryl alcohol | Lauryl alcohol | Lauryl alcohol | Lauryl alcohol |
| Initiator amount (mol %) | 0.15 | 0.15 | 0.15 | 0.15 | 0.15 | 0.15 |
| Feeding ratio | 10 | 10 | 10 | 10 | 10 | 10 |
| Reaction temp. (° C.) | 100 | 80 | 100 | 150 | 100 | 100 |
| Reaction pressure (MPa) | 15 | 15 | 10 | 15 | 15 | 15 |
| Average reaction retention time (mm) | 60 | 60 | 60 | 60 | 60 | 60 |
| Embodiment No. of reaction unit (Table 2) | 1 | 1 | 1 | 1 | 1 | 1 |
| Embodiment of circulation unit | A | A | A | A | A | A |
| Mn | 81,000 | 80,000 | 80,000 | 81,000 | 80,000 | 82,000 |
| Mw/Mn | 1.6 | 1.6 | 1.7 | 1.6 | 1.5 | 1.5 |
| Polymerization rate (%) | 98 | 98 | 99 | 98 | 99 | 98 |
| Residual monomer amount (ppm) | 19,000 | 20,000 | 12,000 | 17,500 | 8,000 | 17,000 |
| Continuous productivity | B | B | B | B | B | B |
| Yellow Index | B | B | A | B | B | B |
| Monomer removal | No | No | No | No | No | No |

TABLE 7

|  | Ex. 20 | Ex. 21 | Ex. 22 |
| --- | --- | --- | --- |
| Monomer | Lactide | Lactide | Lactide |
| Catalyst | DBU | DBU | DBU |
| Initiator | Lauryl alcohol | Lauryl alcohol | Lauryl alcohol |
| Initiator amount (mol %) | 0.15 | 0.15 | 0.15 |
| Feeding ratio | 10 | 10 | 10 |
| Reaction temp. (° C.) | 100 | 100 | 100 |
| Reaction pressure (MPa) | 15 | 15 | 15 |
| Average reaction retention time (min) | 60 | 60 | 60 |
| Embodiment No. of reaction unit (Table 2) | 1 | 1 | 1 |
| Embodiment of circulation unit | B | C | A |
| Mn | 80,000 | 80,000 | 80,000 |
| Mw/Mn | 1.7 | 1.6 | 1.7 |
| Polymerization rate (%) | 95 | 96 | 100 |
| Residual monomer amount (ppm) | 51,000 | 38,000 | 400 |
| Continuous productivity | B | B | B |
| Yellow Index | B | B | B |
| Monomer removal | No | No | Yes |

TABLE 8

| | | Ex. 23 | | Ex. 24 | |
| --- | --- | --- | --- | --- | --- |
| | | System 1 | System 2 | System 1 | System 2 |
| Polymerization step | Monomer | Lactide (L-) | Lactide (D-) | Lactide (L-) | ε-caprolactone |
| | Catalyst | DBU | DBU | DBU | DBU |
| | Initiator | Lauryl alcohol | Lauryl alcohol | Lauryl alcohol | Lauryl alcohol |
| | Initiator amount (mol %) | 0.15 | 0.15 | 0.15 | 0.15 |
| | Feeding ratio | 10 | 10 | 10 | 10 |
| | Reaction temp. (° C.) | 100 | 100 | 100 | 100 |
| | Reaction pressure (MPa) | 15 | 15 | 15 | 15 |
| | Monomer feeding speed (g/min) | 200 | 200 | 600 | 200 |
| | Average reaction retention time (min) | 60 | 60 | 60 | 60 |
| | Embodiment No. of reaction unit (Table 2) | 1 | 1 | 1 | 1 |

TABLE 8-continued

|  |  | Ex. 23 | | Ex.24 | |
| --- | --- | --- | --- | --- | --- |
|  |  | System 1 | System 2 | System 1 | System 2 |
| Embodiment of circulation unit | | A | A | A | A |
| Blending step | Blending temp. (° C.) | 100 | 100 | 100 | 100 |
| | Cylinder internal pressure (MPa) | 15 | | 15 | |
| | Average retention time (min) | 10 | | 10 | |
| | Mn | 80,000 | | 81,000 | |
| | Mw/Mn | 1.8 | | 1.7 | |
| | Polymerization rate (%) | 100 | | 100 | |
| | Residual monomer amount (ppm) | 4,500 | | 4,000 | |
| | Continuous productivity | B | | B | |
| | Yellow Index | B | | B | |
| | Monomer removal | No | | No | |

TABLE 9

|  |  | Ex. 25 | | Ex.26 | |
| --- | --- | --- | --- | --- | --- |
|  |  | System 1 | System 2 | System 1 | System 2 |
|  | Monomer | Lactide (L-) | Lactide (D-) | Lactide (L-) | ε-caprolactone |
| Polymerization step | Catalyst | Tin | Tin | Tin | Tin |
| | Initiator | Lauryl alcohol | Lauryl alcohol | Lauryl alcohol | Lauryl alcohol |
| | Initiator amount (mol %) | 0.15 | 0.15 | 0.15 | 0.15 |
| | Feeding ratio | 10 | 10 | 10 | 10 |
| | Reaction temp. (° C.) | 150 | 150 | 150 | 150 |
| | Reaction pressure (MPa) | 15 | 15 | 15 | 15 |
| | Monomer feeding speed (g/min) | 200 | 200 | 200 | 200 |
| | Average reaction retention time (min) | 60 | 60 | 60 | 60 |
| | Embodiment No. of reaction unit (Table 2) | 1 | 1 | 1 | 1 |
| Embodiment of circulation unit | | A | A | A | A |
| Blending step | Blending temp. (° C.) | 150 | 150 | 150 | 150 |
| | Cylinder internal pressure (MPa) | 15 | | 15 | |
| | Average retention time (min) | 10 | | 10 | |
| | Mn | 81,500 | | 81,000 | |
| | Mw/Mn | 1.7 | | 1.8 | |
| | Polymerization rate (%) | 98 | | 100 | |
| | Residual monomer amount (ppm) | 22,000 | | 400 | |
| | Continuous productivity | B | | B | |
| | Yellow Index | B | | B | |
| | Monomer removal | No | | Yes | |

TABLE 10

|  |  | Ex. 27 | | Ex.28 | |
| --- | --- | --- | --- | --- | --- |
|  |  | System 1 | System 2 | System 1 | System 2 |
|  | Monomer | Lactide (L-) | Lactide (D-) | Lactide (L-) | ε-caprolactone |
| Polymerization step | Catalyst | DBU | DBU | DBU | DBU |
| | Initiator | Lauryl alcohol | Lauryl alcohol | Lauryl alcohol | Lauryl alcohol |
| | Initiator amount (mol %) | 0.15 | 0.15 | 0.15 | 0.15 |
| | Feeding ratio | 10 | 10 | 10 | 10 |
| | Reaction temp. (° C.) | 100 | 100 | 100 | 100 |
| | Reaction pressure (MPa) | 15 | 15 | 15 | 15 |
| | Monomer feeding speed (g/min) | 4 | 4 | 4 | 4 |

TABLE 10-continued

|  | Ex. 27 | | Ex. 28 | |
| --- | --- | --- | --- | --- |
|  | System 1 | System 2 | System 1 | System 2 |
| Average reaction retention time (min) | 60 | 60 | 60 | 60 |
| Embodiment No. of reaction unit (Table 2) | 1 | 1 | 1 | 1 |
| Embodiment of circulation unit | A | A | A | A |
| Mn | 82,000 | | 80,000 | |
| Mw/Mn | 1.7 | | 1.8 | |
| Polymerization rate (%) | 100 | | 100 | |
| Residual monomer amount (ppm) | 3,500 | | 4,500 | |
| Continuous productivity | B | | B | |
| Yellow Index | B | | B | |
| Monomer removal | No | | No | |

TABLE 11

|  |  | Ex. 29 | | Ex. 30 | |
| --- | --- | --- | --- | --- | --- |
|  |  | System 1 | System 2 | System 1 | System 2 |
| Polymerization step | Monomer | Lactide (L-) | Lactide (D-) | Lactide (L-) | ε-caprolactone |
|  | Catalyst | Tin | Tin | Tin | Tin |
|  | Initiator | Lauryl alcohol | Lauryl alcohol | Lauryl alcohol | Lauryl alcohol |
|  | Initiator amount (mol %) | 0.15 | 0.15 | 0.15 | 0.15 |
|  | Feeding ratio | 10 | 10 | 10 | 10 |
|  | Reaction temp. (° C.) | 150 | 150 | 150 | 150 |
|  | Reaction pressure (MPa) | 15 | 15 | 15 | 15 |
|  | Monomer feeding speed (g/min) | 4 | 4 | 4 | 4 |
|  | Average reaction retention time (min) | 60 | 60 | 60 | 60 |
|  | Embodiment No. of reaction unit (Table 2) | 1 | 1 | 1 | 1 |
|  | Embodiment of circulation unit | A | A | A | A |
| Mn |  | 80,000 | | 80,000 | |
| Mw/Mn |  | 1.7 | | 1.8 | |
| Polymerization rate (%) |  | 98 | | 100 | |
| Residual monomer amount (ppm) |  | 19,000 | | 600 | |
| Continuous productivity |  | B | | B | |
| Yellow Index |  | B | | B | |
| Monomer removal |  | No | | Yes | |

TABLE 12

|  | Comp. Ex. 1 | Comp. Ex. 2 | Comp. Ex. 3 | Comp. Ex. 4 | Comp. Ex. 5 |
| --- | --- | --- | --- | --- | --- |
| Monomer | Lactide | Lactide | Lactide | Lactide | Lactide |
| Catalyst | DBU | DBU | DBU | DBU | DBU |
| Initiator | Lauryl alcohol | Lauryl alcohol | Lauryl alcohol | Lauryl alcohol | Lauryl alcohol |
| Initiator amount (mol %) | 0.15 | 0.15 | 0.15 | 0.15 | 0.15 |
| Feeding ratio | 10 | 10 | 10 | 10 | 1500 |
| Reaction temp. (° C.) | 100 | 100 | 100 | 100 | 100 |
| Reaction pressure (MPa) | 10 to 20 | 10 to 20 | 15 | 10 to 20 | 10 to 20 |
| Average reaction retention time (min) | 50 to 70 | 50 to 70 | 60 | 50 to 70 | 50 to 70 |
| Embodiment No. of reaction unit (Table 2) | 13 | 14 | 15 | 17 | 16 |
| Embodiment of circulation unit | No | No | No | No | No |
| Mn | 60,000 | 67,000 | 74,000 | 71,000 | 70,000 |
| Mw/Mn | 3.2 | 1.9 | 1.7 | 2.1 | 2.1 |
| Polymerization rate (%) | 72 | 78 | 86 | 87 | 87 |
| Residual monomer amount (ppm) | 383,000 | 317,000 | 136,000 | 129,000 | 131,000 |
| Continuous productivity | C | C | C | C | C |
| Yellow Index | C | C | C | C | C |
| Monomer removal | No | No | No | No | No |

In Comparative Examples 1 to 5, the pressure loss increased along with an increase in the molecular weight of the reaction product, s and therefore the reaction pressure and the retention time could not appropriately be controlled. As a result, the polymerization rate became 90% or lower, or a failure, such as clogging, was caused so that continuous production could not be excellently performed, as the apparatus that did not have a circulation unit was used.

It was found from the results depicted in Tables 3 to 12 that Examples 1 to 30 could produce an excellent polymer with less deposition, and less tinting, compared to Comparative Examples 1 to 5. As described above, use of the polymer production apparatus of the present invention realized stable operation of the apparatus and improvements in the polymerization rate and continuous productivity without increasing the internal pressure of the apparatus due to an increase in the viscosity caused by the increased molecular weight, even when a high molecular weight polymer having the number average molecular weight of 80,000 or greater is produced.

The embodiments of the present invention are, for example, as follows:

<1> A polymer production apparatus, containing;
a supplying unit containing a first supplying unit configured to supply raw materials containing at least a monomer, and a second supplying unit configured to supply a compressive fluid;
a contacting unit configured to bring the monomer supplied from the first supplying unit and the compressive fluid supplied from the second supplying unit into contact with each other; and
an outlet configured to discharge a reaction product of the monomer,
wherein a reaction unit is provided between the contacting unit and the outlet, where the reaction unit is configured to pass the monomer from the side of the contacting unit to the side of the outlet, while allowing the monomer to carry out a polymerization reaction in the presence of the compressive fluid supplied from the second supplying unit, and
wherein the reaction unit contains at least a circulation unit containing a first pipe and a second pipe, where the first pipe is a pipe through which a fluid containing the monomer and the compressive fluid is passed from the side of the contacting unit to the side of the outlet, and the second pipe is configured to return the fluid from a return port provided at an upstream side of an extrusion unit to an inlet provided at an upstream side of the return port.

<2> The polymer production apparatus according to <1>, wherein the reaction unit contains the extrusion unit provided more adjacent to the outlet than the circulation unit.

<3> The polymer production apparatus according to <1> or <2>, wherein a cooling device configured to cool the fluid passing through the second pipe is provided.

<4> The polymer production apparatus according to any one of <1> to <3>, wherein the first pipe is arranged in a manner that the fluid passing through the second pipe has a vertical direction vector component.

<5> The polymer production apparatus according to any one of <1> to <4>, wherein the second pipe is arranged in a manner that the fluid passing through the second pipe has a vertical direction vector component.

<6> The polymer production apparatus according to any one of <1> to <5>, wherein a monomer removal unit is provided at a downstream side of the outlet, where the monomer removal unit is composed of a pelletizer in vacuum.

<7> A polymer production method, containing:
passing a compressive fluid and raw materials including a monomer, the compressive fluid and the raw materials being continuously brought into contact with each other, from upstream to downstream, while allowing the monomer to carry out a polymerization reaction, and passing from the downstream to the upstream, at least part of a fluid containing the raw materials and the compressive fluid, which is flown down to the downstream, to thereby circulate the fluid.

<8> The polymer production method according to <7>, further containing removing a monomer from an obtained polymer product by means of a pelletizer in vacuum.

This application claims priority to Japanese application No. 2013-240425, filed on Nov. 20, 2013 and Japanese application No. 2014-171174, filed on Aug. 26, 2014 and incorporated herein by reference.

What is claimed is:

1. A polymer production apparatus, comprising:
a supplying unit containing a first supplying unit configured to supply raw materials containing at least a monomer, and a second supplying unit configured to supply a compressive fluid;
a contacting unit configured to bring the monomer supplied from the first supplying unit and the compressive fluid supplied from the second supplying unit into contact with each other; and
an outlet configured to discharge a reaction product of the monomer,
wherein a reaction unit is provided between the contacting unit and the outlet, where the reaction unit is configured to pass the monomer from the side of the contacting unit to the side of the outlet, while allowing the monomer to carry out a polymerization reaction in the presence of the compressive fluid supplied from the second supplying unit, and
wherein the reaction unit contains at least a circulation unit containing a first pipe and a second pipe, where the first pipe is a pipe through which a fluid containing the monomer and the compressive fluid is passed from the side of the contacting unit to the side of the outlet, and the second pipe is configured to return the fluid from a return port provided at an upstream side of an extrusion unit to an inlet provided at an upstream side of the return port.

2. The polymer production apparatus according to claim 1, wherein the reaction unit contains the extrusion unit provided more adjacent to the outlet than the circulation unit.

3. The polymer production apparatus according to claim 1, wherein a cooling device configured to cool the fluid passing through the second pipe is provided.

4. The polymer production apparatus according to claim 1, wherein the first pipe is arranged in a manner that the fluid passing through the second pipe has a vertical direction vector component.

5. The polymer production apparatus according to claim 1, wherein the second pipe is arranged in a manner that the fluid passing through the second pipe has a vertical direction vector component.

6. The polymer production apparatus according to claim 1, wherein a monomer removal unit is provided at a downstream side of the outlet, where the monomer removal unit is composed of a pelletizer in vacuum.

7. A polymer production method, comprising:
using the polymer production apparatus according to claim 1, passing the compressive fluid and the raw materials including the monomer, the compressive fluid and the raw materials being continuously brought into contact with each other, from upstream to downstream, while allowing the monomer to carry out the polymerization reaction, and passing from the downstream to the upstream, at least part of a fluid containing the raw materials and the compressive fluid, which is flown down to the downstream, to thereby circulate the fluid.

8. The polymer production method according to claim 7, further comprising removing a monomer from an obtained polymer product by means of a pelletizer in vacuum.

\* \* \* \* \*